United States Patent
Tuvell et al.

(10) Patent No.: US 9,542,555 B2
(45) Date of Patent: *Jan. 10, 2017

(54) MALWARE DETECTION SYSTEM AND METHOD FOR COMPRESSED DATA ON MOBILE PLATFORMS

(71) Applicant: Pulse Secure LLC, San Jose, CA (US)

(72) Inventors: George Tuvell, Westerville, OH (US); Deepak Venugopal, Irving, TX (US)

(73) Assignee: Pulse Secure, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,391

(22) Filed: Apr. 13, 2015

(65) Prior Publication Data

US 2016/0012227 A1    Jan. 14, 2016

Related U.S. Application Data

(63) Continuation of application No. 11/697,658, filed on Apr. 6, 2007, now Pat. No. 9,009,818.

(60) Provisional application No. 60/789,766, filed on Apr. 6, 2006, provisional application No. 60/789,748, filed on Apr. 6, 2006, provisional application No.
(Continued)

(51) Int. Cl.
```
G06F 21/00    (2013.01)
G06F 21/56    (2013.01)
H04L 29/06    (2006.01)
H04W 12/12    (2009.01)
G06F 17/30    (2006.01)
H04W 12/10    (2009.01)
```

(52) U.S. Cl.
CPC ....... *G06F 21/566* (2013.01); *G06F 17/30424* (2013.01); *G06F 21/56* (2013.01); *G06F 21/562* (2013.01); *G06F 21/563* (2013.01); *G06F 21/564* (2013.01); *G06F 21/565* (2013.01); *H04L 63/145* (2013.01); *H04L 63/1441* (2013.01); *H04W 12/12* (2013.01); *G06F 2221/033* (2013.01); *H04W 12/10* (2013.01)

(58) Field of Classification Search
CPC ........ G06F 21/00; G06F 21/56; G06F 21/562; G06F 21/563; G06F 21/564; G06F 21/566; H04L 63/1441; H04L 63/145
USPC ........................ 726/22, 24, 23; 713/187–194
See application file for complete search history.

(56) References Cited

U.S. PATENT DOCUMENTS 3,296,105 A    1/1967    Rushmere et al.
3,501,447 A    3/1970    Peiper et al.
(Continued)

FOREIGN PATENT DOCUMENTS

WO    9512162 A1    5/1995

OTHER PUBLICATIONS

International Search Report from International Application No. PCT/US2007/08644, dated Dec. 19, 2007, 3 pp.
(Continued)

*Primary Examiner* — William Goodchild
*Assistant Examiner* — Helai Salehi
(74) *Attorney, Agent, or Firm* — Shumaker & Sieffert, P.A.

(57) ABSTRACT

A system and method for detecting malware in compressed data. The system and method identifies a set of search strings extracted from compressed executables, each of which is infected with malware from a family of malware. The search strings detect the presence of the family of malware in other compressed executables, fragments of compressed executables, or data streams.

11 Claims, 13 Drawing Sheets

Related U.S. Application Data

60/789,749, filed on Apr. 6, 2006, provisional application No. 60/789,746, filed on Apr. 6, 2006, provisional application No. 60/789,744, filed on Apr. 6, 2006, provisional application No. 60/789,745, filed on Apr. 6, 2006, provisional application No. 60/789,743, filed on Apr. 6, 2006, provisional application No. 60/789,958, filed on Apr. 6, 2006, provisional application No. 60/824,649, filed on Sep. 6, 2006, provisional application No. 60/828,491, filed on Oct. 6, 2006.

(56) References Cited

U.S. PATENT DOCUMENTS

| | | |
|---|---|---|
| 5,371,160 A | 12/1994 | Crowe et al. |
| 5,452,442 A | 9/1995 | Kephart |
| 5,675,711 A | 10/1997 | Kephart et al. |
| 5,919,257 A | 7/1999 | Trostle |
| 6,357,008 B1 | 3/2002 | Nachenberg |
| 6,391,995 B2 | 5/2002 | Murugan et al. |
| 6,577,920 B1 | 6/2003 | Hypponen et al. |
| 6,785,818 B1 | 8/2004 | Sobel et al. |
| 6,934,857 B1 | 8/2005 | Bartleson et al. |
| 6,971,019 B1 | 11/2005 | Nachenberg |
| 6,973,305 B2 | 12/2005 | McLean |
| 6,987,963 B2 | 1/2006 | Kouznetsov et al. |
| 7,000,250 B1 | 2/2006 | Kuo et al. |
| 7,065,790 B1 | 6/2006 | Gryaznov |
| 7,069,594 B1 | 6/2006 | Bolin |
| 7,076,650 B1 | 7/2006 | Sonnenberg |
| 7,080,408 B1 | 7/2006 | Pak et al. |
| 7,086,090 B1 | 8/2006 | Dawson, Jr. et al. |
| 7,089,592 B2 | 8/2006 | Adjaoute |
| 7,096,368 B2 | 8/2006 | Kouznetsov et al. |
| 7,096,501 B2 | 8/2006 | Kouznetsov et al. |
| 7,146,642 B1 | 12/2006 | Magdych et al. |
| 7,150,042 B2 | 12/2006 | Wolff et al. |
| 7,155,742 B1 | 12/2006 | Szor |
| 7,171,689 B2 | 1/2007 | Beavers |
| 7,231,440 B1 | 6/2007 | Kouznetsov et al. |
| 7,251,830 B1 | 7/2007 | Melchione |
| 7,509,680 B1 | 3/2009 | Sallam |
| 8,090,816 B1 | 1/2012 | Deshmukh et al. |
| 8,312,545 B2 | 11/2012 | Tuvell et al. |
| 8,321,941 B2 | 11/2012 | Tuvell et al. |
| 8,561,193 B1 * | 10/2013 | Srivastava ............ G06F 21/563 713/152 |
| 9,009,818 B2 | 4/2015 | Tuvell et al. |
| 9,064,115 B2 | 6/2015 | Tuvell et al. |
| 2002/0049862 A1 | 4/2002 | Gladney et al. |
| 2002/0066024 A1 * | 5/2002 | Schmall ................ G06F 21/563 726/24 |
| 2002/0099518 A1 | 7/2002 | Tovinkere et al. |
| 2003/0023865 A1 | 1/2003 | Cowie et al. |
| 2003/0074573 A1 * | 4/2003 | Hursey ................ G06F 21/564 726/22 |
| 2003/0115483 A1 | 6/2003 | Liang |
| 2003/0131248 A1 | 7/2003 | Huang |
| 2003/0159070 A1 | 8/2003 | Mayer et al. |
| 2003/0172294 A1 | 9/2003 | Judge |
| 2003/0233574 A1 | 12/2003 | Kouznetsov et al. |
| 2004/0002882 A1 | 1/2004 | Safa |
| 2004/0034794 A1 | 2/2004 | Mayer et al. |
| 2004/0060046 A1 | 3/2004 | Good et al. |
| 2004/0064737 A1 | 4/2004 | Milliken et al. |
| 2004/0068663 A1 | 4/2004 | Sobel |
| 2004/0098482 A1 | 5/2004 | Asano |
| 2004/0107342 A1 | 6/2004 | Pham et al. |
| 2004/0123117 A1 | 6/2004 | Berger |
| 2004/0172551 A1 | 9/2004 | Fielding et al. |
| 2004/0181687 A1 | 9/2004 | Nachenberg et al. |
| 2004/0260775 A1 | 12/2004 | Fedele |
| 2005/0055559 A1 | 3/2005 | Bucher |
| 2005/0060535 A1 | 3/2005 | Bartas |
| 2005/0065851 A1 | 3/2005 | Aronoff et al. |
| 2005/0081053 A1 | 4/2005 | Aston et al. |
| 2005/0108557 A1 | 5/2005 | Kayo et al. |
| 2005/0132184 A1 | 6/2005 | Palliyil et al. |
| 2005/0216749 A1 | 9/2005 | Brent |
| 2005/0216762 A1 | 9/2005 | Peikari |
| 2005/0229254 A1 | 10/2005 | Singh et al. |
| 2005/0251862 A1 | 11/2005 | Talvitie |
| 2006/0005244 A1 | 1/2006 | Garbow et al. |
| 2006/0026687 A1 | 2/2006 | Peikari |
| 2006/0041863 A1 | 2/2006 | Saito |
| 2006/0048227 A1 | 3/2006 | Ohta et al. |
| 2006/0064755 A1 | 3/2006 | Azadet et al. |
| 2006/0075501 A1 | 4/2006 | Thomas et al. |
| 2006/0117386 A1 | 6/2006 | Gupta et al. |
| 2006/0130141 A1 | 6/2006 | Kramer et al. |
| 2006/0130144 A1 | 6/2006 | Wernicke |
| 2006/0161984 A1 | 7/2006 | Phillips et al. |
| 2006/0161985 A1 | 7/2006 | Zhao |
| 2006/0217111 A1 | 9/2006 | Marolia et al. |
| 2006/0217113 A1 | 9/2006 | Rao et al. |
| 2006/0236393 A1 | 10/2006 | Kramer et al. |
| 2006/0242709 A1 | 10/2006 | Seinfeld et al. |
| 2006/0276173 A1 | 12/2006 | Srey et al. |
| 2006/0278694 A1 | 12/2006 | Jha et al. |
| 2006/0282528 A1 | 12/2006 | Madams et al. |
| 2006/0288411 A1 | 12/2006 | Garg et al. |
| 2007/0056035 A1 | 3/2007 | Copley |
| 2007/0168678 A1 | 7/2007 | Meenakshisundaram |
| 2007/0192863 A1 | 8/2007 | Kapoor et al. |
| 2007/0239999 A1 | 10/2007 | Honig et al. |
| 2007/0240215 A1 | 10/2007 | Flores et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2008/0282349 A1 * | 11/2008 | Koui ...................... G06F 21/56 726/24 |
| 2009/0254992 A1 | 10/2009 | Schultz et al. |

OTHER PUBLICATIONS

Prosecution History from U.S. Appl. No. 11/697,658, dated Sep. 14, 2010 through Dec. 12, 2014, 139 pp.

* cited by examiner

MALWARE DETECTION SYSTEM AND METHOD FOR COMPRESSED DATA ON MOBILE PLATFORMS

CROSS REFERENCE TO RELATED APPLICATIONS

This application is a continuation of U.S. patent application Ser. No. 11/697,658, filed Apr. 6, 2007, which claimed the benefit of U.S. Application Nos. 60/789,766, filed Apr. 6, 2006; 60/789,748, filed Apr. 6, 2006; 60/789,749 filed Apr. 6, 2006; 60/789,746, filed Apr. 6, 2006; 60/789,744, filed Apr. 6, 2006; 60/789,745, filed Apr. 6, 2006; 60/789,743, filed Apr. 6, 2006; 60/789,958, filed Apr. 6, 2006; 60/824,649, filed Sep. 6, 2006; and 60/828,491, filed Oct. 6, 2006, the entire contents of each of which are hereby incorporated by reference.

TECHNICAL FIELD

The present invention relates generally to systems, devices, and methods for detecting malware in mobile networks and mobile devices.

BACKGROUND

Traditional malware signature detection methods extract signatures from an invariant portion of the actual executable part of a target application being scanned for malware. However, these detection methods present numerous problems when implemented in mobile networks and on mobile platforms.

A major constraint of scanning within a network is fragmented data. Generally, mobile phone applications contain executables which are compressed and divided into multiple packages for facilitating transmission of such executable in a mobile network. These data packages must then be re-assembled and uncompressed prior to installation and execution. For example, software installation files (SIS packages) in the Symbian® operating system and CAB packages in the Windows Mobile® operating system, have to be re-assembled and "uncompressed" to obtain the executables. Therefore, while scanning for malware, it is not possible to obtain the entire data corresponding to a malicious application because the malicious application may exist across multiple packages in a compressed format. Also, it is cumbersome and time consuming to attempt to re-assemble and uncompress such data packets as they pass through the mobile network due to the latency these operations would introduce.

Also, comprehensive signature matching as a virus or malware detection method on memory-constrained devices, like mobile phones, is difficult to efficiently implement due to the need for a large database of identified malware signatures. String matching is also processor intensive and results in a high computational tax on a mobile device wherein such mobile platforms have relatively low processing power such that large processing and memory requirements results in lowered performance and excessive battery drain.

When files in file systems are modified, it is good practice to run malware checks on any changed files. However, some mobile device operating systems provide only a flag to indicate that a file somewhere in the file system has change. Therefore, it is difficult to determine which file to scan for malware.

Malware checking using signatures is often processor and memory intensive. Malware also changes constantly, requiring continual updates to stay current. Therefore, some of the best and most advanced programs for detecting malware are usually running at network operations centers and may not be available for running on mobile handsets. Mobile handsets, especially those with limited processing capability and operating systems or those that do not permit memory access for malware scanning, will require some other method of verifying that resident applications are free of malware.

In some mobile devices, e.g., BlackBerry® type devices by Research In Motion® and some Palm® devices, access to the binary code of an installed program is prohibited by the operating system. Access to the binary code in other devices may also be limited due to constraints such as power, permissioning, or other limitations. Therefore, one cannot always apply the traditional binary, signature-based methods of scanning binary code to detect malware in such devices.

Using traditional signature detection, every malware variant will have its own signature. Polymorphic viruses, i.e., viruses that change their signatures every time they replicate, may create undetectable variants. Scalability is also a concern for these signature-based detection algorithms since a new signature needs to be added for every new malware variant in the worst case.

Even though each new malware variant tends to perform the same or similar kind of malicious behavior, traditional signature detection can only detect a new malware variant by adding a new signature to its list and scanning for the new signature. As the list of variants grows, the number of signatures grows, further taxing a system's computational and storage capacity.

Signature-based detection requires both storage of a large number of known malware signatures and processing capacity to search for suspected malware programs with those signatures. Mobile devices however are limited in both storage space and computational ability, thus making them difficult platforms for using existing methods of malware detection that were designed for more robust computing platforms such as desktop and laptop systems.

Most malware, whether worm or virus, share a common characteristic: they tend to spread over time from one device to another device if not contained. The ability to get up-to-date and real-time metrics on mobile networks is valuable to network administrators tracking worm and other virus attacks. There is a need to assimilate statistical information about potential malware on the network and present it to network administrators in a meaningful way so they can quickly become apprised of worm and other virus attacks before they have had a chance to widely proliferate.

New malware and malware variants are constantly appearing. Once new malware has been identified, service providers need a way to update mobile devices in the network so that they can remove the new malware from the mobile devices or prevent other mobile devices from becoming infecting. With most malware prevention systems, users manually initiate a process to update their malware prevention system with a server. In the interim, however, their systems remain vulnerable to the new malware. With the growing popularity of smart phones and the potential for greater interaction between mobile phones, there is a need to be able to update mobile devices as soon as new malware is identified.

SUMMARY OF THE INVENTION

The present invention meets the above and other needs. The following embodiments represent various aspects of a malware detection system and method of the present invention.

Malware Signature Detection Using a Mobile Application's Header and Compressed Code

Detection of malware using intelligently generated signatures catches a large number of new malware variants. The approach is to generate unique signatures for different classes or families of malware rather than one for each specific malware variant. This makes signature detection more reliable when detecting variants of a virus. Mobile malware are classified into families based on their functionality. The present system and method exploits the similarity in data among members of one malware family based on the assumption that some parts of the compressed data remain similar when minor changes are made to the uncompressed data. The system and method extracts generic signatures from "compressed data" and the non-compressed part of the data or packets. This system and method is ideal for in-network malware detection because a target application or data packet does not have to be uncompressed prior to detecting malware.

Malware Detection Using Hashing Algorithms

Detection of malware using a hash pattern matching algorithm is effective for low-power/low-memory mobile platforms. A two-part hash in conjunction with a set of heuristics helps to eliminate malware signature mismatches faster, resulting in faster search characteristics. This platform independent system and method minimizes the amount of memory required to store malware signature patterns and efficiently uses the limited computational resources found on a mobile platform.

On-Write Malware Scanning Framework

An on-write malware scanning framework augments operating systems that provide only a flag indicating whether or not a file has changed in a system. The framework provides a flexible, lightweight means for efficiently monitoring each directory node in separate, yet interconnected, processes. Each process independently monitors the system flag and is responsible for monitoring the files in its own local node for changes and reporting any changes to the malware checking process.

Checksum Application Integrity Checking

A checksum application integrity checking system and method uses checksums to perform integrity checks of executables used by a mobile platform, such as a mobile phone. This checksum based approach is ideal for malware detection when changes are made to executable content or system libraries on the mobile device itself. Initially, the system and method stores the checksums from a clean device with applications that are known to be malware-free. Any changes to a checksum value indicates that the executable as possibly being malware-infected. The checksum is easily re-computable and represents the integrity of the entire executable.

Malware Detection on Limited Access Devices

A feature based system and method uses information about the application to distinguish and detect malware. Generically called features, this other information varies in accordance with the system being scanned, the files present, and the program itself. In different embodiments a variety of different combinations of these features are aggregated to create a feature set that acts as an identifier for a specific application. In this way, a unique identifier for a malware program is created that has a distinctive feature set that distinguishes it from safe programs which are malware-free. For any newly identified malware, a feature set is extracted after analysis and stored as a malware identifier. These malware identifiers can be created off-line or using a variety of on-line methods and then distributed to malware or anti-virus detection systems. These malware detection systems may be located on individual mobile platforms and implement the present system and method for detecting malware. The feature based system and method detects malware by extracting a combination of features, or feature set, from the target application which it then compares to pre-defined feature sets that define malware programs. A complete match indicates that the target application contains a known malware variant.

Heuristic Malware Detection

A heuristic approach to malware detection enables the detection of unknown malware. The solution is based on heuristic rules derived from Bayesian decision theory. Heuristic virus scanning techniques based on features/rules are applied to known malware-infected executables to develop a probability model of the behavior of a malicious application. Specifically, the heuristic rules are derived from a classification based on DLL imports collected from malware infected executables which are directly linked to the functionality of a program. The system and method exploits common functionality among different virus or malware samples to identify malware without using signatures.

Malware Detection Using Code Histograms

Malware variants tend to perform the same malicious actions, even though they have different identifying signatures. Using statistical analysis, profiles of the code instructions used to perform the malicious actions are developed into a probability model, enabling a malware detection process to search for the profile of the malicious behavior rather than a specific signature variant. The profile is a histogram probability model of the number and frequency of different code instructions in an application that contains malware. The system and method exploits common functionality among different malware to identify malware without using signatures.

Feature Based Malware Detection

It is possible to identify potential malware based on probability models derived from both code analysis and from monitoring the behavior of suspected malware on the mobile platform. In particular, code analysis and associated behavior are used to create feature sets and models of malware behavior. Notably, the system and method is successful in identifying new, never before seen malware without being resource intensive, thereby making it especially adaptable for use on mobile platforms.

Reporting System

The present invention also is a system and method for reporting and visualizing worm and other virus or malware attacks on mobile platforms and networks. The system and method provides a comprehensive means for collecting, reporting, and providing visual depictions of information regarding the propagation and effect of worms, viruses and other malware on a mobile network. Carrier and enterprise network operators and managers use real-time statistics to understand the effect malware has on their mobile networks and the mobile platforms, e.g., mobile phones, connected to their networks.

Updating Malware Protection Using a Device Independent Secure Management Protocol

The present invention is a system and method for enabling service providers to update malware protection on mobile platforms. A device independent secure management protocol, such as the Open Mobile Alliance (OMA) complaint application on a client device (mobile platform), allows malware protection to be managed by a service provider's mobile network server, such as a Device Management (DM) server. Using the device independent secure management protocol, malware protection system updates are performed on mobile platforms in the service provider's network as soon as new malware is detected and identified.

BRIEF DESCRIPTION OF DRAWINGS

The accompanying figures depict multiple embodiments of the malware detection system for mobile platforms. A brief description of each figure is provided below. Elements with the same reference numbers in each figure indicate identical or functionally similar elements. Additionally, as a convenience, the left-most digit(s) of a reference number identifies the drawings in which the reference number first appears.

FIG. 13 is a screen snapshot of sample user infection report on CoreStats.

FIG. 14 is a screen snapshot of sample virus producer report on CoreStats.

DETAILED DESCRIPTION

Exemplary embodiments of the present invention are detailed in FIGS. 1-15.

Malware Signature Detection Using a Mobile Application's Header and Compressed Code Mobile applications are transported to mobile platforms across mobile networks using software installation files or SIS packages in the case of Symbian®, and CAB packages in the case of Windows Mobile®. These data packages are compressed before being sent across the mobile network and due to their large size they are often fragmented by the network in the process of being transported. The following detailed description discloses a method and system for detecting malware in these compressed and fragmented data packages without necessitating concatenating all the fragments back together or first decompressing the package in its entirety on a receiving mobile platform. For convenience, a mobile platform is a mobile telephone, a smart phone, a mobile computing device, a smart handheld device, a network element, or any comparable mobile device.

Figure 1:
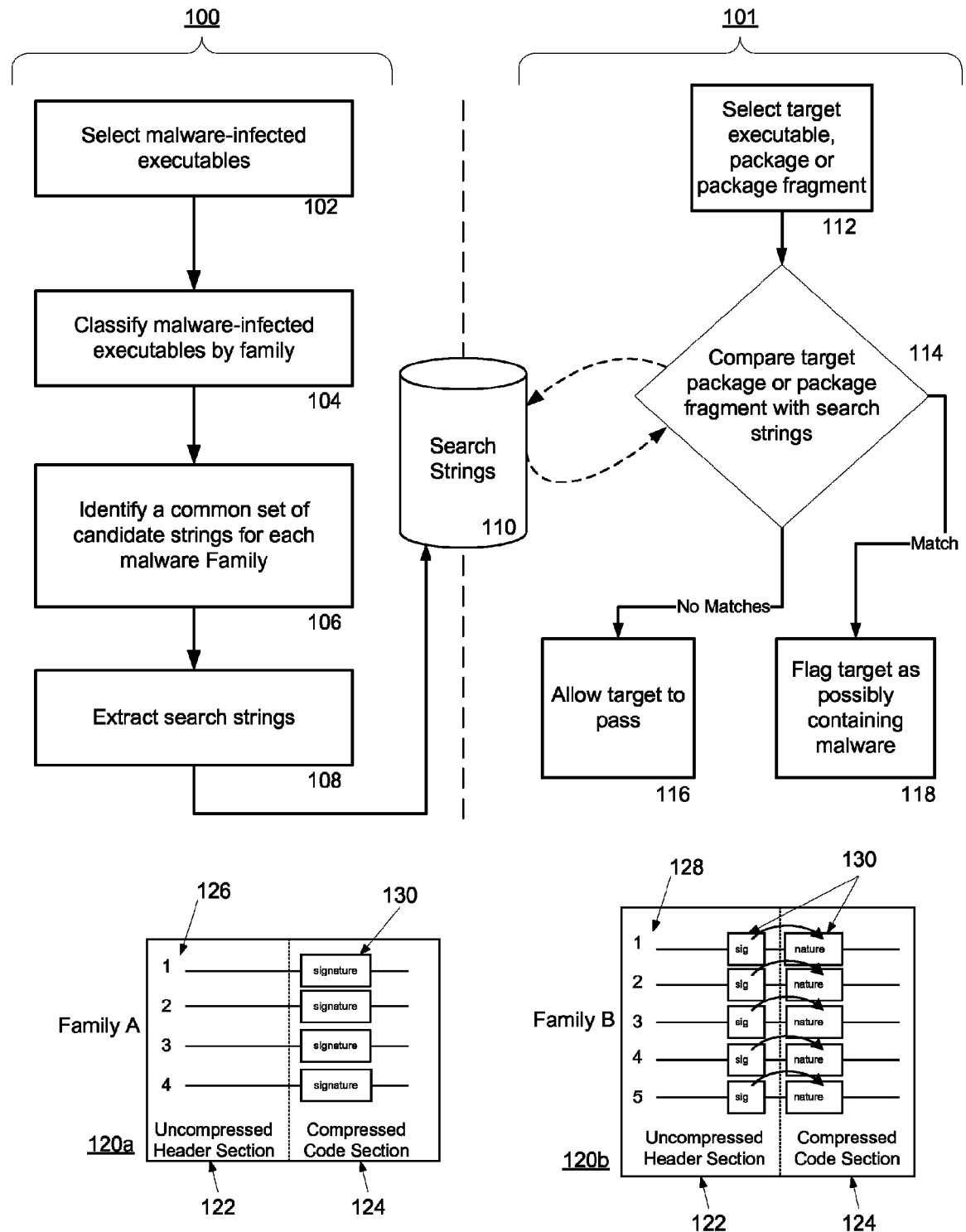
FIG. 1 is a flow chart diagram of a malware detection method for mobile platforms using search strings derived from the uncompressed headers and compressed code sections of data packages.

Referring now to the flowchart diagram of a compressed signature method depicted in FIG. 1, a signature extraction system and method (collectively, method) 100 has the operations of selecting 102 malware infected packages or executables, classifying 104 the malware-infected packages/executables into families, identifying 106 common strings as candidate strings, or candidate signature strings, 130 within a family of malware, and extracting 108 a semi-optimal set from those candidate signature strings 130 as search strings to populate a search string database 110. For example, as shown for convenience, the malware families, Family A 120*a* and Family B 120*b*, have executables 126, 128 respectively containing malware from which candidate signature strings 130 are identified 106; each executable having both an uncompressed header section 122 and a compressed code section 124.

A signature detection method 101 has the steps of selecting 112 a target executable, package or package fragment and comparing 114 the package contents to the search string database 110 to determine if the package contains a matching search string, and either flagging or identifying 118 the package if a match indicates it is malware-infected, or allowing 116 the target package to pass if it is malware-free.

Signature Extraction:

A signature extraction method 100 builds a search string database 110 containing a semioptimal set of signature or search strings extracted 108 from the header and code section candidate strings 130. In one embodiment, the signature extraction method 100 selects 102 a large number of SIS packaged executables (a package or package fragment) 120*a*, 120*b* which are known to contain malware, here represented for illustrative purposes only as malware infected executables 1-4 126 in Family A 120*a* and malware-infected executables 1-5 128 in Family B 120*b*. The executables 120*a*, 120*b* are then classified 104 by family. To allow detection of all the variants of a malware family, a common set of strings labeled as candidate, or signature, strings 130 for each malware family is identified 106 in either or both the uncompressed header section 122 of the packaged executable 120*a*, 120*b* and the compressed code section 124. These strings 130 serve as representative signatures for a malware family, and significantly reduce the total number of signatures that need to be searched in order to extract 108 the semi-optimal set later stored in the search string database 110. Note that due to inter-family code overlap, it is possible that these strings are also used to detect samples from other unrelated malware families as well.

It is desirable to further reduce the number of strings in the set of candidate strings 130 to minimize the total number of strings required to detect all malware samples, but still maintain multiple strings for each malware family to ensure a reasonable probability of detecting new malware variants. New malware variants are assumed to contain at least one of the search strings. In a preferred embodiment, a greedy algorithm is used to compute a semi-optimal set of candidate strings 130 which covers most different malware samples. The candidate strings 130 are ordered in a priority queue (Q) with the tail of the queue always containing the string that covers (or occurs in) the largest number of strings not covered by any other string. The following is a preferred greedy algorithm finds a semi-optimal set of candidate strings 130 to use as the search strings in the signature detection method 101.

Initially all samples are considered to be uncovered. Each element of the queue (Q) comprises the signature string and the set of samples it covers.

```
While (there exist more samples to cover II Q is not empty)
{
    F=Remove_Tail (Q)
    Include F in the result set.
    For every element X in Q
        If (F covers the sample s that X also covers)
        {
            Increment s :: Number of times covered
            If(s :: Number of times covered> threshold), where the
                threshold is a variable defining the number of
                signatures that need to be present in one malware
                sample
            {
                Sample s is considered covered
                Decrement the number of samples covered by X
            }
        }
    End For
}
```

Other types of optimal search strategies may be employed by those of ordinary skill in the art, including for example, heuristic, evolutionary, and dynamic programming approaches among others to compute the candidate strings 130 that comprise the extracted signature strings. Note that although the candidate strings 130 in Family A 120a and Family B 120b show the candidate strings 130 in identical places for all malware 126, 128 in each family of malware, the candidate strings 130 may actually be located in different places in the different malware 126, 128 that comprise a malware family 120a, 120b. It is common in malware displaying polymorphism for candidate strings 130 to be displaced or fragmented differently from one malware variant 126, 128 to another.

One aspect of this system and method is the reduction of candidate strings 130. Allowing every sequence of n bytes as a potential signature or candidate string 130 from the compressed data 124 would create very large numbers of potential signature strings 130. To reduce the number of potential candidate signature strings 130 in the compressed code section 124, only strings that are not ASCII text strings from the code portion of the compressed data 124 are identified 106 and extracted 108. This is done because malware variants sometimes change the text strings for filename, file-path, etc., and using the ASCII text strings would therefore result in signatures that are less robust and less able to detect malware variants. Additionally, the candidate signature strings 130 are identified 106 and extracted 108 as signatures 130 if those strings are present only in malware-infected files and not applications that are malware-free. At least three different strings are extracted 108 and used as the candidate signature strings 130 in the header and code section search string database 110. Different numbers of candidate signature strings 130 for the header and code section signature search string database 110 can be selected based on the need to balance the desire to use fewer candidate signature strings 130 to reduce the amount of data required to identify malware with the desire to keep the candidate signature strings 130 set large enough to provide good results.

Signature Detection:

The signature detection method 101 first selects 112 a target package or package fragment containing an executable to be scanned. The signature detection method 101 next compares 114 the target package, or executable or package fragment, to the header and code section signature search string database 110. If a search string is found, the signature detection method 101 flags 118 the target package or package fragment as possibly containing malware. If no signature is found, the signature detection method 101 allows 116 the target package or package fragment to pass through the system as being malware-free.

The header and code section signature search string database 110 containing search strings selected from header and code section candidate strings 130 provides a reduced set of information suitable for scanning target packages or package fragments as they pass through network elements, such as routers and gateways, on either a carrier or enterprise network to a mobile platform or device. By directly scanning the compressed target application, anti-virus actions are taken without the need to uncompress the files passing through the mobile network. The reduced search string set of candidate signature strings 130 also reduces the amount of time necessary to scan a specific target package or package fragment thereby enabling efficient scanning in a network router or mobile device without adding additional latency. The reduced search string set of candidate strings 130 enables efficient scanning of target package fragments as the fragments arrive on a mobile platform, further reducing latency in the model device. The method and system also allows scanning the target package without having to first decompress the package, further reducing the possibility of infection by any malware.

Malware Detection Using Hashing Algorithms

Storing and efficiently searching for an exhaustive list of malware signatures on a mobile platform is difficult given the limited memory, battery, and computational resources of mobile platforms in general. The followed detailed description discloses a method and system for detecting malware that minimizes the amount of memory required to store malware signature patterns and efficiently uses the limited computational resources found on a mobile platform to quickly scan for malware.

Figure 2:
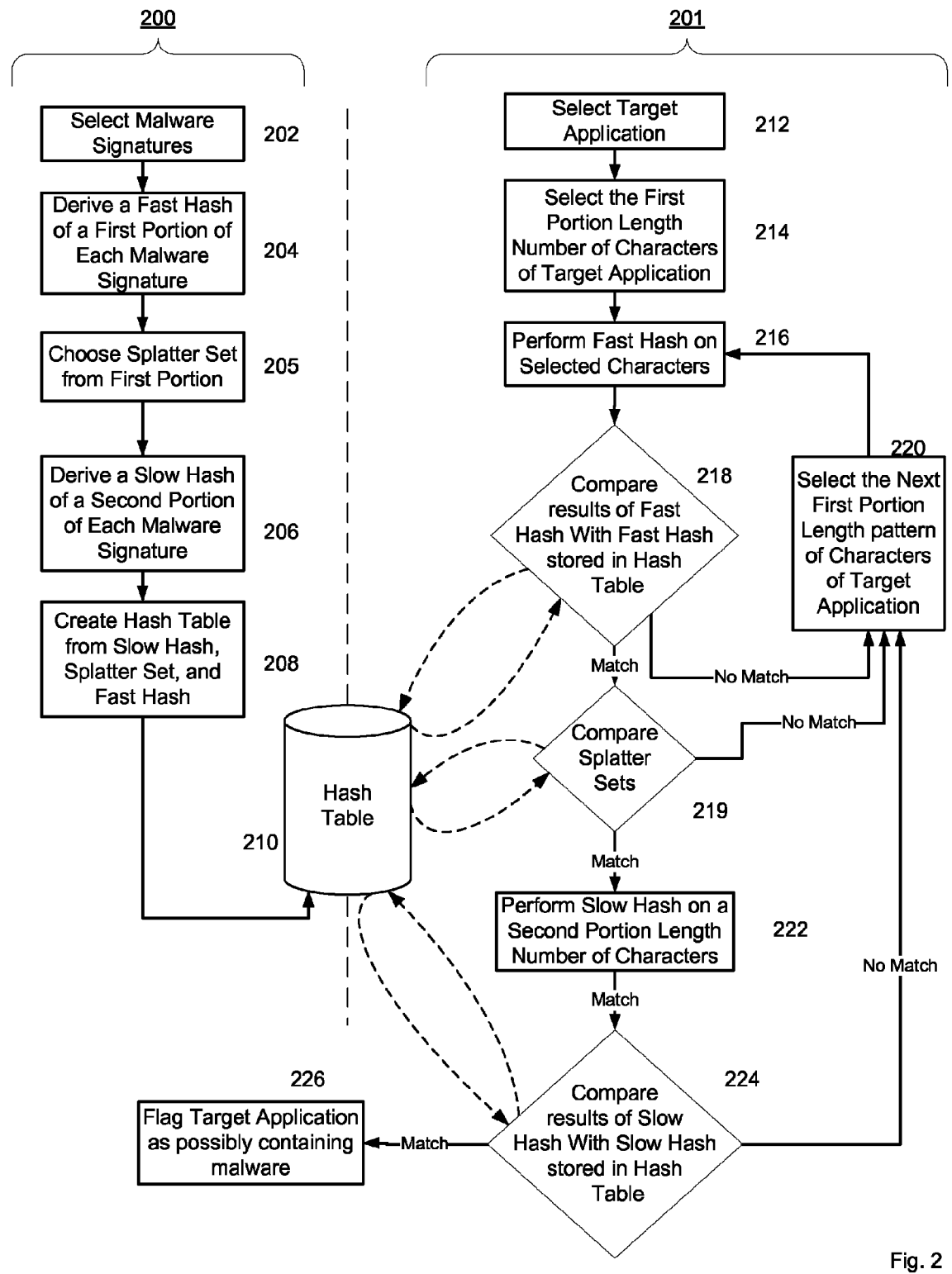
FIG. 2 is a flow chart diagram of a malware detection method that uses hashing to optimize malware detection on mobile platforms.

Referring now to the flowchart diagram of the hash detection method depicted in FIG. 2, a hash table generation method 200 has the operations of selecting 202 malware signatures, deriving 204 a fast hash from a first portion of each malware signature, choosing 205 a splatter set from the first portion, deriving 206 a slow hash from a second portion of each malware signature, and creating 208 a hash table from the derived fast hashes, chosen splatter sets, and derived slow hashes to populate a hash table 210. A hashed signature detection method 201 has the operations of selecting 212 a target application, selecting 214 a set of characters of the same length as the first portion used to derive 204 the fast hash, performing 216 the fast hash on the selected characters, and comparing 218 the result to the fast hash stored in the hash table 210 to see if the hashes match. If there is not a match, then continuing to select 220 a next set of characters by shifting one byte or block in the target application, and repeating steps of performing 216 a fast hash and comparing 218 the result with fast hashes in the hash table 210. If there is a match, then comparing 219 the splatter set from the first portion stored in the hash table 210 with a splatter set of the selected characters from the target application. If there is a match of the splatter sets then performing 222 a slow hash on a set of characters of the same length as the second portion used to derive 206 the slow hash and comparing 224 the result to the slow hash store in the hash table 210 to see if the hashes match. If there is not a match, then returning to the step of selecting 220 a next set of characters to fast hash. If there is a match, then identifying or flagging 226 the target application as possibly being malware-infected.

Figure 3:
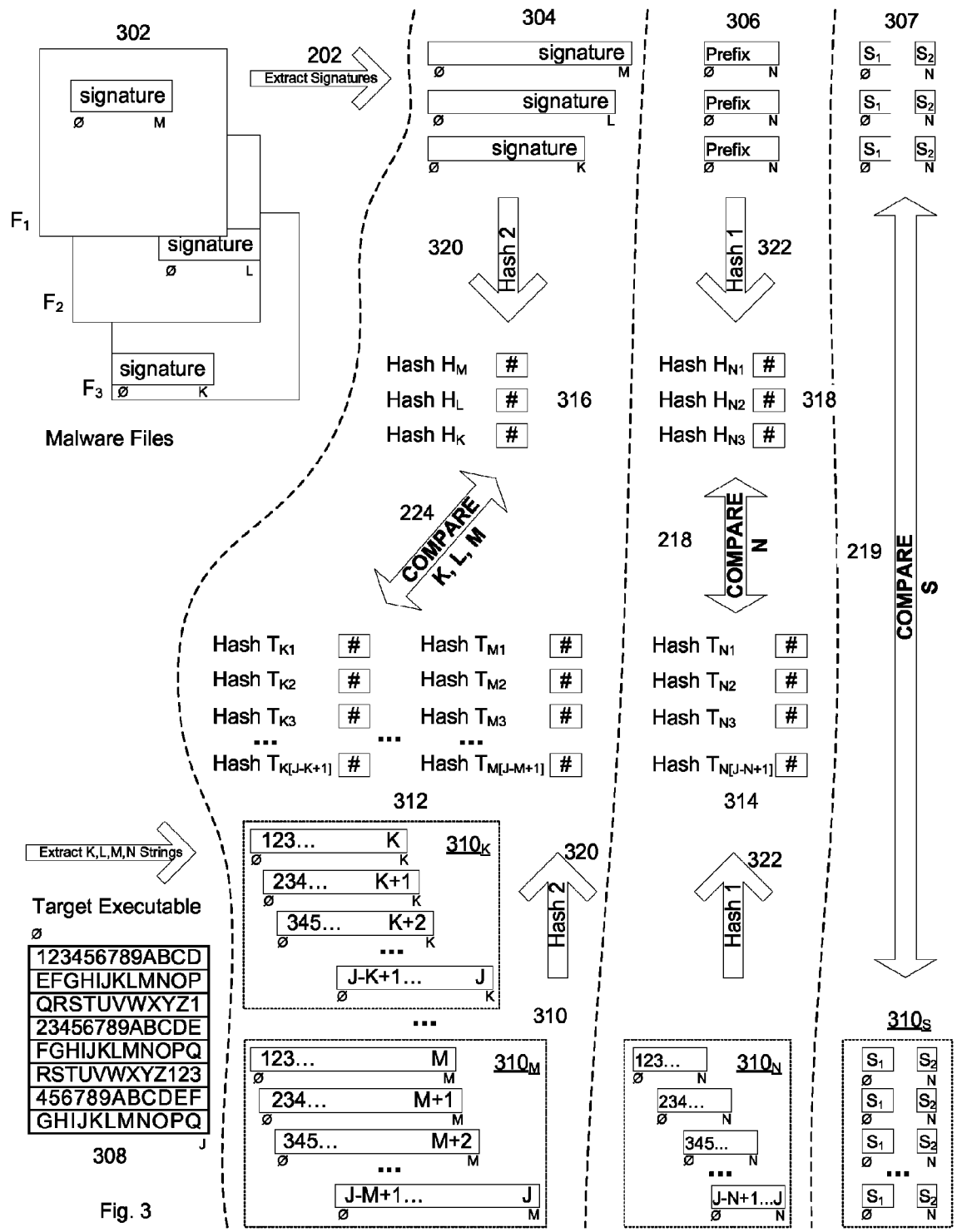
FIG. 3 is a diagram of the hashing process of the malware detection method that uses hashing.

Referring now to the diagram of the hashing process depicted in FIG. 3, a set of malware files 302 containing malware signatures 304 of lengths M, L, and K are hashed to the malware signature hashes 316 HM, HL, and HK using a second hash (Hash 2) 320. Equal-sized portions, or prefixes 306, of the malware signatures 304 also are hashed to fast hash values 318 HN1, HN2, and HN3 using a first hash (Hash 1) 322. Pseudorandom splatter sets 307 are chosen from the prefixes 306.

Continuing to refer to FIG. 3, a target application 308 of length J contains J-K+1 possible target strings 310K of length K blocks or bytes, J-L+1 possible target strings 310L of length L blocks or bytes (not shown for convenience), J-M+1 possible target strings 310M of length M blocks or bytes, and J-N+1 possible target strings 310N of length N blocks or bytes. These hash into multiple series of hashes 312 wherein there is one hash value for each of the possible K, L, and M-length target strings 310K, 310L, 310M, using the second hash 320. A single series of hashes 314 for the N-length possible target strings 310N is hashed using the first hash 322. Additionally, a pseudorandom target splatter set 310s is chosen from the N-length target strings 310N.

Hashing and Heuristic Methods:

Rather than searching for malware signature strings 304 directly in a target application 308, malware signatures 304 previously extracted from malware-infected files 302 are first 15 selected 202 and hashed by deriving 206 a first hash 322, and deriving 208 a second hash 320 in a hash table generation method 200 to significantly reduce their size. By hashing the malware signature strings, the comparison steps 224, 218 become greatly simplified. Instead of searching for long malware strings 304 directly in the target application 308, the target application 308 is repeatedly hashed into a series of short strings or preferably single values, making the comparison steps 224, 218 computationally simple and fast. In one exemplary embodiment, the hash is a 64-bit numeric value, but other hash results could also be utilized.

However, hashing is, in general, a computationally expensive process, and therefore the savings in the comparison steps 224, 218 can be offset by the processor intensive hashing process itself. To improve the performance of the system and method and reduce the computational load on a mobile platform implementing the method, a two-stage hashing process and two exemplary heuristic algorithms are utilized to reduce this computational burden in the hash table generation method 200 and the hash signature detection method 201. The two-stage hashing process comprises an optimized fast hash (first hash 322) and a rigorous slow hash (second hash 320). The heuristic algorithms comprise a minimum prefix match and a pseudo-random splatter set.

Minimum Prefix Matching Heuristic Method:

The minimum prefix match reduces the hashed malware signatures 318 to a common fixed size, or prefix 306. This significantly reduces the number of comparisons necessary in the first compare step 218 of the hash signature detection method 201. The minimum prefix can be derived as follows:

Minimum Prefix Match

Let S={SO, S1, . . . , Sm} be an arbitrary string. We Define
S'={SO, S1, . . . Sk} as a prefix Of S
if k<m, k is called the Prefix-length.
Minimum Prefix is a prefix of S with Prefix-Length=1 min, where 1 min is the length of the smallest signature in the Rule-Base.

Without the prefix, hashes of the target application 308 would need to be computed for each byte or block offset of the target application 308 for each length of malware signature 304, which can be of variable lengths, for example K, L, M. Then, each of the hashes would have to be compared 218 with each of the malware signature hash 316 entries in the hash table 210. Such processing requirements result in an enormous computation expense, involving multiple simultaneous or sequential hashing operations and multiple comparisons. With the minimum prefix match, only a single hash value from the series of hashes 314 of length N for each byte or block offset of the target application 308 is compared 218 to the fast hash value 318 entries in the hash table 210. Because there can be hundreds of different malware string lengths, this minimum prefix match potentially reduces the computational load in the hashed signature detection method 201 by factor of a hundred or more, or more precisely to 1/x where x is the number of different signature lengths.

Fast Signature Hashing and Fast Hash Signature Detection:

In the hash table generation method 200, the malware signatures 304 are selected 202 and a first hash 322 is derived 204 from a first portion, or prefix 306, of the malware signatures 304 using a fast hash called a filter hash. The purpose of the filter hash is to provide a computationally simple hash that can be optimized algorithmically. This filter hash is run once for each first portion length target string 310N in the target application 308 as a first hash 322 in the hash signature detection method 201. The filter hash is used to quickly determine to a good degree of probability whether a malware signature 304 is present in the selected string of the target application 308. An example fast filter hash is provided below.

Let S={S1S2 . . . Sn} be an arbitrary string of length n.
Filter(Smk)=pos1*[Sm]+pos2*[Sm+1]+ . . . posk*[Sm+k-1], where Filter(Smk) is the Filter-Hash Value for k-lengthed Substring of S starting at position m, [Sn] is the integer value associated with byte Sn, and pos1, pos2 . . . , posm are positive integral values.

This particular fast filter hash algorithmically reduces to the following:

For any arbitrary stringS={SOS2 . . . Sm}
Initialize for any positive integral value k,
Filter(Sik)=Filter(S(i-1)k)-[S(i-1)]+[S(i-1+k)]-(Sum-[S(i-1)])
Sum=Sum+[S(i-1+k)]-[S(i-1)]

Proof:

Let, H(n)=S1*pos1+S2*pos2+ . . . +Sn*posn then, H(n+1)=S2*pos1+ . . . +Sn+1*posn H(n+1)−H(n)=−S1*pos1+S2*(pos1−pos2)+Sn*(posn−posn−1)+Sn+1*posn Without loss of generality, we can assume pos1=1, pos2=pos1+1 and so on H(n+1)−H(n)=−S1+Sn+1*posn+[S2+ . . . +Sn]

H(n+1)=H(n)−S1+Sn+1*posn+[S2+ . . . +Sn]

Hence the recursive relation:

H(n+1)=H(n)−[First Element of pattern starting at n]+[Last Element of pattern starting at n+1]−[Sum(elements in pattern starting at n)−[First Element of pattern starting at position n]]

By choosing this particular fast filter hash, the first hash 322 can be performed 216 recursively in the hash signature detection method 201 without having to completely re-compute the entire hash value for each hash in the single series of hashes 314. Only some elements of the hash value are computed each iteration. This dramatically reduces the computational expense of having to re-compute the entire first hash 322 each time for each first portion length target string 310N before checking that computed hash value against the fast hash values 318 HN1, HN2, and HN3. Other fast filter hashes could similarly be used.

The prefix 306 defines the first portion of each malware signature 304 to be hashed in deriving 204 the fast hash. This same length is used in performing 216 the fast hash during the hash signature detection method 201. The system and method next selects 214 a length of characters in the target application 308 identical to the length of characters used to derive 204 the fast hash, and performs 216 the fast hash on those selected characters. The system and method then compares 218 that result with the stored hash values 318 in the hash table 210. If there is no match, the system and method selects 220 the next pattern of characters to hash by shifting one byte, character, or block further in the target application 308, and repeats the steps of performing 216 the hash, comparing 218 the result, and selecting 220 the next pattern until there is a match in the compare 218 step or until there are no additional portion-sized 306 patterns left in the target application 308. An embodiment of the hash signature detection method 201 that utilizes the prefix 306 is therefore as follows, where the second hash in the method, the DJB hash, will be defined and explained in a subsequent section:

---

Let, R = {R1, R2, ... ,Rn} be the Set of Rule-Signatures
Input: S = {S0, S1, ... ,Sm}
Minimum Prefix Length = m
For i =1 to m
   If(Search(Filter(Sim ),R) ==Found)
   {
      IF(DJB(Rj) == DJB(Sij ) )
      R' u= Rj
   }
End For
Output: R' = {R1, R2, ... ,Rk} called the Matched-Set consisting of rules whose signatures matched substrings inS.

---

The Search function is implemented using Hash-Sort with Filter(Sim)% m as the Hashing-Index. This Search function also compares the pseudorandom splatter set 307, described in a later subsection, at that position in the hash table 210 to the target pseudorandom splatter set 310s derived from that N-length target string 310N.

Fast Signature Hashing and Detection without Utilizing the Prefix Heuristic Method In another embodiment of the present invention, the prefix heuristic method is not employed, and instead the system uses the full length malware strings 304. An example pattern matching routine without the prefix heuristic method is as follows:

---

Let,    R = {R1, R2, ... ,Rn}
       L = {L1, L2, ... ,Ln }, be the Set of Rule-Signatures and their corresponding lengths in the Rule-Base.
Algorithm n-Pattern Match
Input: S = {S0, S1, ... ,Sm}
For i =1 to m
For j = 1 to n
   IF(Filter($R_{0Lj}$ ) == Filter($S_{ij}$))
   {
      IF(DJB($R_{0Lj}$) == DJB($S_{ij}$) )
      R' U= $R_j$
   }
End For
End For
Output: R' = {R1, R2, ... ,Rk} called the Matched-Set consisting of rules whose signatures matched substrings in S.

---

Note that this n-pattern match algorithm requires generating fast hash values 312 for each n-length malware signature. This method computes n different fast filter hash values (corresponding to n signature lengths) for each input position in the target application 308, creating multiple series of hashes 312, and requires individually comparing 218 each element in the multiple series of hashes 312 individually with the corresponding fast hashed malware signature hashes 316 stored in the hash table 210. Malware signatures 304 can be very long or very short, especially in the case of fragmented polymorphic viruses, where several malware signature fragments together identify a single malware variant. As the size of the hash table 210 increases, the performance of this embodiment decreases proportionally for each additional length of malware signature 304.

Pseudorandom Splatter Set Heuristic Method:

Because of its simplicity, a fast filter hash will generate some false positives. To eliminate some false positives, a pseudorandom splatter set 307 and a pseudorandom target splatter set 310s provide an extra level of comparison before performing 222 the more rigorous slow or second hash 320. The pseudorandom splatter set requires choosing, or deriving, 205 a number of pseudorandom bytes or blocks from the prefix 306 for each malware signature 304 to create a pseudorandom splatter set 307 that is stored along with the hashes in the hash table 210 as part of the hash table generation method 200. An exemplary pseudorandom splatter set algorithm follows:

---

Pseudorandom Splatter Set

Input: Minimum Prefix Length m
   String S= {S0 S1 ... Sm}
For i=0 to m
   Seed Random Number generator with Filter(Sim)
   Obtain x random positions i1,ix between 0 and m
   {Si1 .... Six} is called the Random Splatter Set R
End For
Output: Random Splatter Set R

---

The pseudorandom target splatter set 310s consists of the same pattern of pseudorandom points in the target strings 310N. The pseudorandom points in both the pseudorandom splatter set 307 and a pseudorandom target splatter set 310s must match in the compare 219 step before performing the rigorous slow hash 320.

Slow Signature Hashing and Slow Signature Detection:

If at any time there is a match in the fast hash compare 218 step and the pseudorandom compare step 219, the hashed signature detection method 201 performs 222 a slow hash on a second portion 304 of the target application 308, starting at the current position and using the same length of characters used in deriving 206 the slow hash. The hashed signature detection method 201 then compares 224 that result with the slow hashes 316 stored in the hash table 210. If there is not a match, the selecting 220 step continues from where it left off, as if there had been no match during the last compare 218 step. If there is a match in the compare 224 step, the system and method identifies or flags 226 the target application 308 as possibly containing malware.

A second hash 320 is derived 206 using a more rigorous hash called a slow hash. An example slow hash is the DJB hash provided below:

```
Initialize D =5381
For i=m to k
    D = ((D << 5) +D)+ [Si]
end For
DJB( Smk)=D
DJB( Smk) denotes the DJB-Hash value for k-lengthed Substring of S
starting at position m
```

The variable D in the DJB Hash function is selected as the prime number 5381. Other numbers, including other prime numbers, can be used to initialize the hashing function. The selection of alternative initial values for the variable D may be selected by one of ordinary skill in the art based upon the performance of a given value in hashing the arbitrary string S. The purpose of the slow hash is to ensure that virtually no false positives are likely. The slow hash is performed 222 only if the fast hash generates a positive indication of a match in the fast hash compare 218 step and there is a positive indication of a match in the splatter set compare 219 step.

Because the slow hash compare 224 is performed only a fraction of the number of times the fast hash compare 218 is performed it is somewhat less important to optimize the hashing process for the slow hash. In one embodiment of the present invention, deriving 206 the slow hash is done with the whole portion of each of the malware signature strings 304. In another embodiment of the present invention, deriving 206 the slow hash is done using the same portion 306 as the fast hash. There are numerous other embodiments, capable of achieving similar results, that would be obvious to one having ordinary skill in the art.

These exemplary embodiments of the present invention are platform independent methods that utilize a two-stage hash in conjunction with a set of heuristics to quickly eliminate malware signature mismatches. The system and method results in a minimized amount of memory required to store malware signature patterns and results in fast malware search characteristics.

On-Write Malware Scanning Framework

Figure 4:
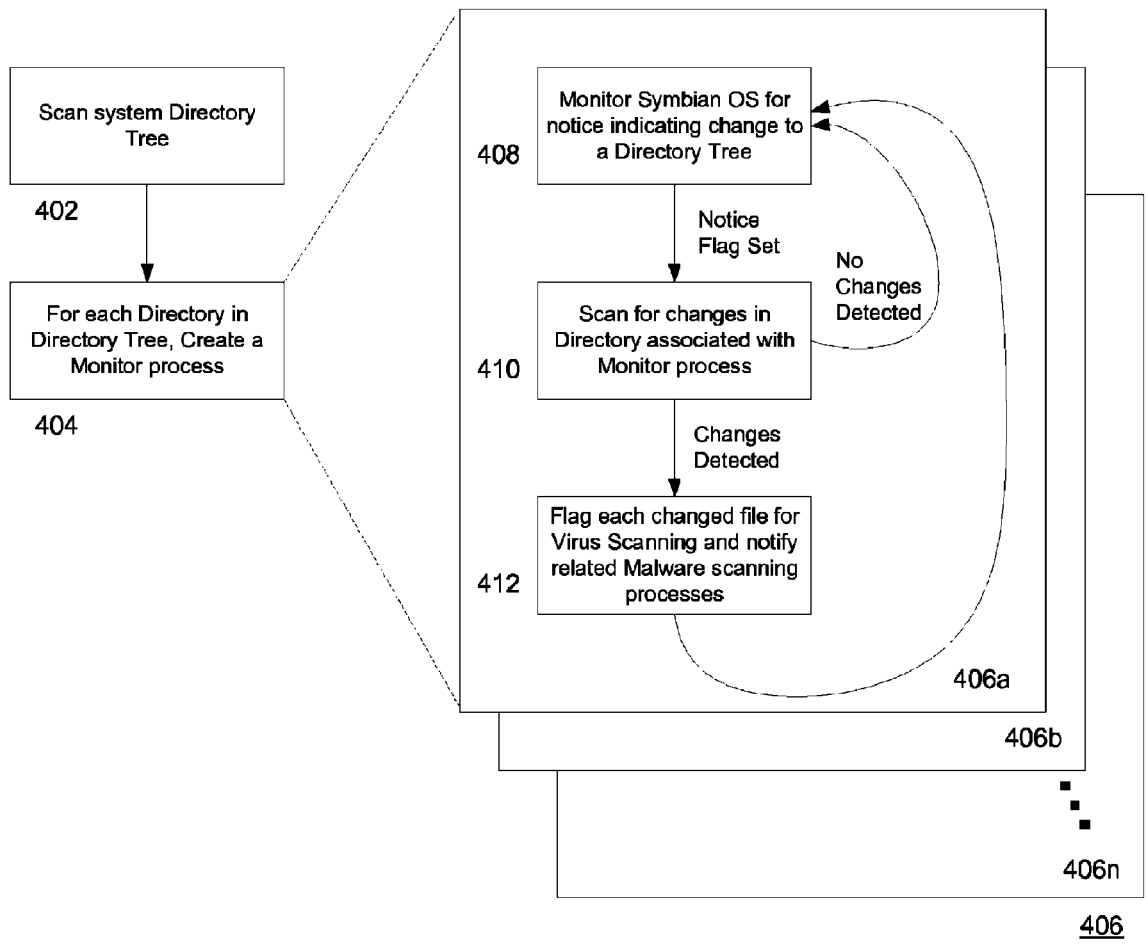
FIG. 4 is a flow chart diagram of a malware detection method for mobile platforms that monitors directories for changed files.
Figure 5:
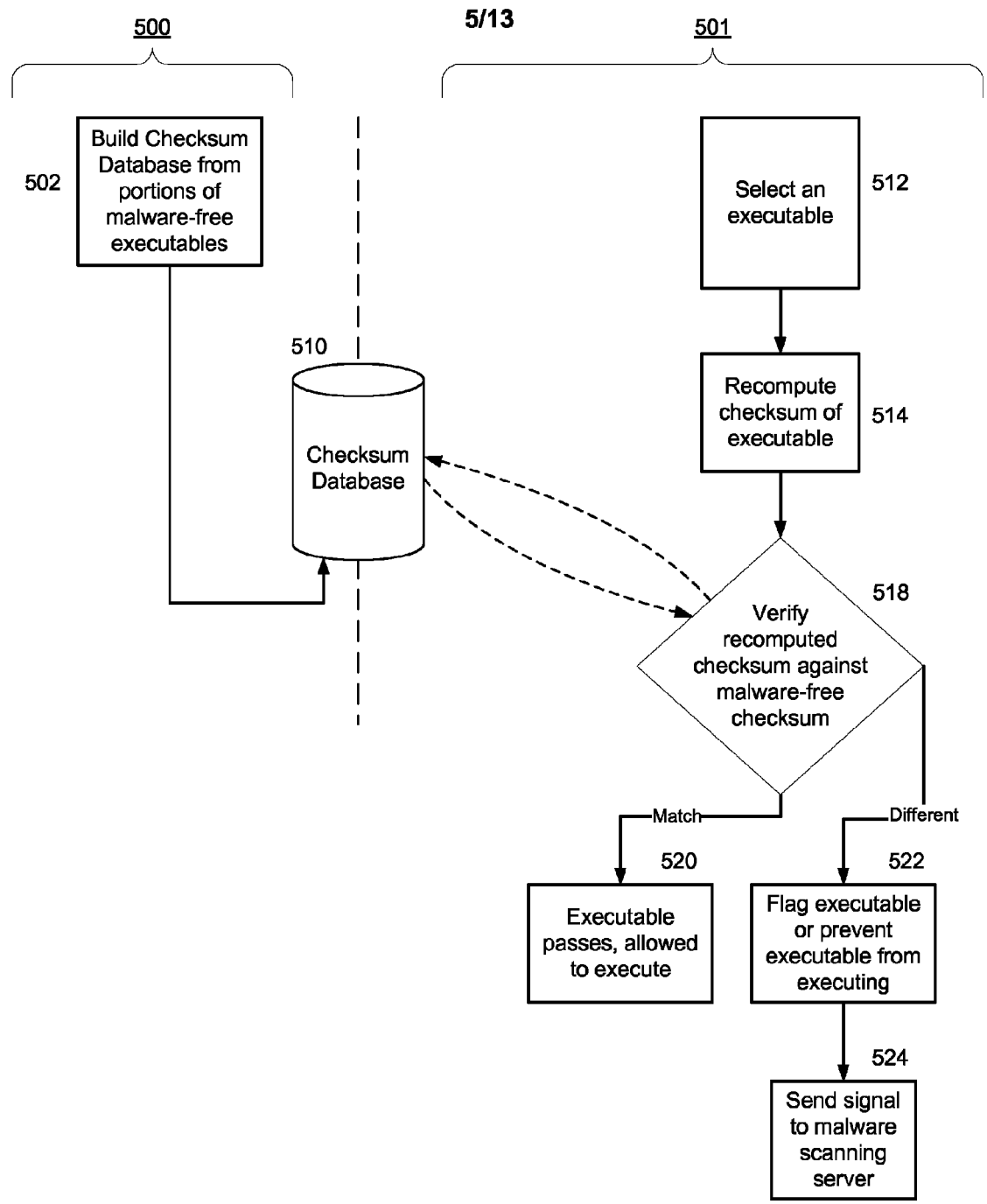
FIG. 5 is a flow chart diagram of a malware detection method for mobile platforms that verifies the checksum of an application against a known malware-free version of the application.

The method and system for an on-write malware scanning framework 400 monitors the file system and is shown in FIG. 4. The on-write malware scanning framework 400 scans the system directory tree 402 and for each directory in the directory tree 402, it creates 404 a monitor process 406a, 406b, . . . , 406n. Each monitor process, 406a, 406b, . . . , 406n, monitors 408 the operating system file system change notification flag, and when the flag is set, scans 410 the directory associated with the monitoring process for file changes. If no changes are found, the monitor processes 406 go back to monitoring 408 the operating system file system change notification flag. If changes are found, the monitor processes 406 identify or flag 412 each changed file and notify a malware scanning process.

An exemplary embodiment is presented as follows. A file system in a Symbian® OS is organized like Microsoft Windows® (drives, directories, sub-directories and files). Referring now to the flowchart diagram of an on-write detection method depicted in FIG. 4, the on-write malware scanning framework 400 keeps track of any file or folder change in the file system by creating 404 monitor processes 406 for each directory folder. Each monitor process 406a, 406b, . . . , 406n has a data structure as shown below for its directory folder.

```
Monitor Process
{
    Subfolder List
    File List
    Root
    FileServer Session
}
```

Each monitor process 406 contains a Subfolder_List, File_List and a Root that corresponds to the folder which is being watched. The File_List keeps track of the current Files in the Root and the Subfolder_List keeps track of the current sub folders in the Root.

Each monitor process 406a, 406b, . . . , 406n is an active object implemented within the Symbian® OS. The monitor processes 406 have a low priority and maintain an active session with the Symbian® File Server using the function RFs::NotifyChange(Root) which notifies the monitor processes 406 of any change to the root folder. Each monitor process 406a, 406b, . . . , 406n handles the change notification. Each monitor process 406a, 406b, . . . , 406n compares the current state of the Root with the state stored in the File_List and Subfolder_List.

The File_List and Subfolder_List maintain a set of file/folder names along with their timestamps. When a monitor process 406a, 406b, . . . , 406n that is monitoring 408 the Symbian® OS obtains a notification of file system change from the file server, it scans 410 through the current set of files and folders. If no new files/folders exist then the monitor process 406a, 406b, . . . , 406n ignores this notification and goes back to monitoring 408. If files/folders are missing then it is a notification for deletion and the monitor process 406a, 406b, . . . , 406n updates its lists. If there is a new file/folder found for a particular monitor process 406a, 406b, . . . , 406n then the monitor process 406a, 406b, . . . , 406n handles the notification by flagging 412 the file/folder and notifying the malware scanning processes.

Most new mobile phones, and operating systems including the Symbian® operating system (OS) allow the insertion of memory cards without switching off the device. The root monitor 406a lies at the very top level of the file system. When the root monitor 406a monitoring 408 the OS obtains a file change notification, it compares a list of active drives to a list that was created when the object was started to see if a new drive was mounted on the device. For the root monitor 406a physical drives are its folders, which it treats the same way that other monitors 406 treat folders, with one small exception. For the embodiment on the Symbian® OS, the method and system for an on-write malware scanning framework 400 makes the root monitor 406a process protected so the application will not exit when a memory card is inserted into the device.

The on-access or on-write scanner embodiment presented herein preferably monitors file system changes using active objects as implemented within the Symbian® OS. In other operating systems, the on-write scanner is implemented using other comparable objects. For example, in a multi-threaded operating environment, the on-write scanner is implemented as a separate low-priority thread or as a low-priority process.

Checksum Application Integrity Checking

A system and method for application integrity checking on mobile platforms uses checksums to verify that an application is malware-free after a file is modified. In the checksum database building process 500, a checksum database 510 is built 502 from executables known to be malware-free. When a mobile platform, e.g., a mobile device, tries to execute or modify 512 an executable, the application integrity checking process 501 recomputes a checksum of the executable and checks 514 to see if the malware-free checksum of the executable is stored on the mobile device. If the malware-free checksum is not stored locally on the mobile device, the mobile device queries 516 a remote checksum database 510 for the malware-free checksum of the executable. The application integrity checking process 501 then verifies 518 that the recomputed checksum of the executable matches the malware-free checksum from the mobile device's database or the checksum database 510. If it matches, the application integrity checking process 501 ignores 520 the modification to the executable or allows 520 the executable to run. If it does not match, the application integrity checking process 501 identifies, flags and/or prevents 522 the executable from running, and a sends 524 a signal or notice to a malware scanning server. The following details checksum database building process 500 for creating a checksum database 510 and an application integrity checking process 501 for verifying 518 the checksum on a mobile platform.

The system and method for application integrity checking on mobile devices uses a checksum based approach to prevent executable binaries from being modified for malicious activity once they are installed on the device. Referring now to the flowchart diagram of a checksum based method depicted in FIG. 5, a checksum database building process 500 initially builds 502 a checksum database 510 by collecting data from all the executable files on a device, or from any desired set of executable files, known to be malware-free. In an alternative embodiment, some or all information used to build 502 the checksum database 510 is imported from a known source of pre-computed checksum data, such as from an operational support system.

Much of the information used in the checksum database building process 500 to build 502 the checksum of an executable file is available in the header of an executable and is therefore very easy to extract. In an exemplary embodiment, the checksum built 502 and entered into the checksum database 510 for each executable is a combination of:

1) The sum of all 32-bit values in the code section and import section of the executable;
2) A byte sequence at the entry point in the program;
3) The size of import table; and,
4) The size of the import section.

The sum of all the 32-bit values in the code section and import section partially ensure data integrity. But because it is possible for malware to preserve the same checksum but change the actual code of the executable, additional components are added to increase the robustness of the preferred checksum. The byte sequence at the entry point of the program ensures that malicious code cannot add jump statements when the executable runs. The size of the import table and import section are also separately verified to check for integrity.

In an alternative embodiment, a Cyclic Redundancy Check (CRC) checksum is used instead of the simpler checksum described above. Use of the CRC checksum provides increased robustness at the price of additional complexity. When using a CRC checkup the system and method must re-compute the checksum for a file, e.g., an executable, every time a file write occurs.

A change in checksum indicates that the executable has been changed. This change can be as a result of malware trying to overwrite the file. When a particular executable file has been modified 512, or when an mobile device attempts to execute 512 an executable, the application integrity checking process 501 checks 514 to see if the checksum is stored locally on the mobile device. The checksum database 510 is stored locally on the mobile device or alternatively, as in the case of an enterprise or network based anti-virus service, an enterprise or network server provides the mobile device with specific application checksum data when queried 516 by a given mobile device. When the checksum database 510 is stored on another server, it is also possible for the mobile platform or device to verify 518 programs already installed on the device during installation. The application integrity checking process 501 then verifies 518 the executable checksum against the checksum from the checksum database 510 or local copy. If it matches, the application integrity checking process 501 ignores 520 the modification to the executable or allows 520 the executable to run. If it does not match, the application integrity checking process 501 identifies, flags and/or prevents 522 the executable from running, and sends 524 a signal or notice to a malware scanning server in the mobile network.

An embodiment of the disclosed system and method for an application integrity checking process 501 on mobile devices and mobile phones using the Symbian® OS is presented herein. The Symbian® kernel performs some basic checks before running an executable file. In particular, it checks if the Uid (a unique identifier for the application) has been tampered with or if the data has been changed. But these checks are very simple to avoid. For example, a malicious programmer can patch the changed data and recomputed checksum to make the infected file look valid.

Another embodiment of the system and method for an application integrity checking process 501 is described for Symbian® E32 format executables. The implementation is based on building a hash table of relevant E32 header information of all installed files and system libraries and using this to periodically check for possible infections. The E32 format already provides all the elements needed for the checksum described above through the E32 header. The E32 header in the Symbian® OS contains the iChecksumCode, iEntryPoint, iImportOffset information. This information can be directly used to check the integrity of the file.

Initially, the checksum database 510 is built on a clean device. The entries in the checksum database 510 are hashed based on the name of the executable. Each entry, following the checksum format described above, contains the following information:

1) iCheckSumCode.
2) 64 bytes starting from iEntryoint,
3) Size of import-table at iimportOffset 4) Size of import section=iCodeRelocOffset-iimportOffset When a file-write event for an executable file occurs, the new checksum elements are compared against the stored ones. The entries in the stored checksum table are updated based on the event that a file is created, deleted or replaced. In particular, when a file is replaced a check is made on the new file to ensure that invalid format or 0 byte executable files do not replace valid ones. The stored checksums are themselves vulnerable to corruption by a virus since they are stored on the device. An integrity check is first made on the stored checksum table by comparing the sum of all bytes from the last store to the present value. If the checksum database 510 itself is corrupted, then it is generated again after cleaning the entire device with a virus scanner.

A checksum application integrity checking system and method uses checksums to perform integrity checks of the executables used by a mobile platform. This checksum based approach is used to keep track of possible changes made to executable content or system libraries on the device. Initially, the system and method stores the checksums from a clean device with applications that are known to be malware-free. Any changes to a checksum value flags the executable as possibly being malware-infected. The checksum is easily re-computable and represents the integrity of the entire executable.

Malware Detection on Limited Access Devices

Figure 6:
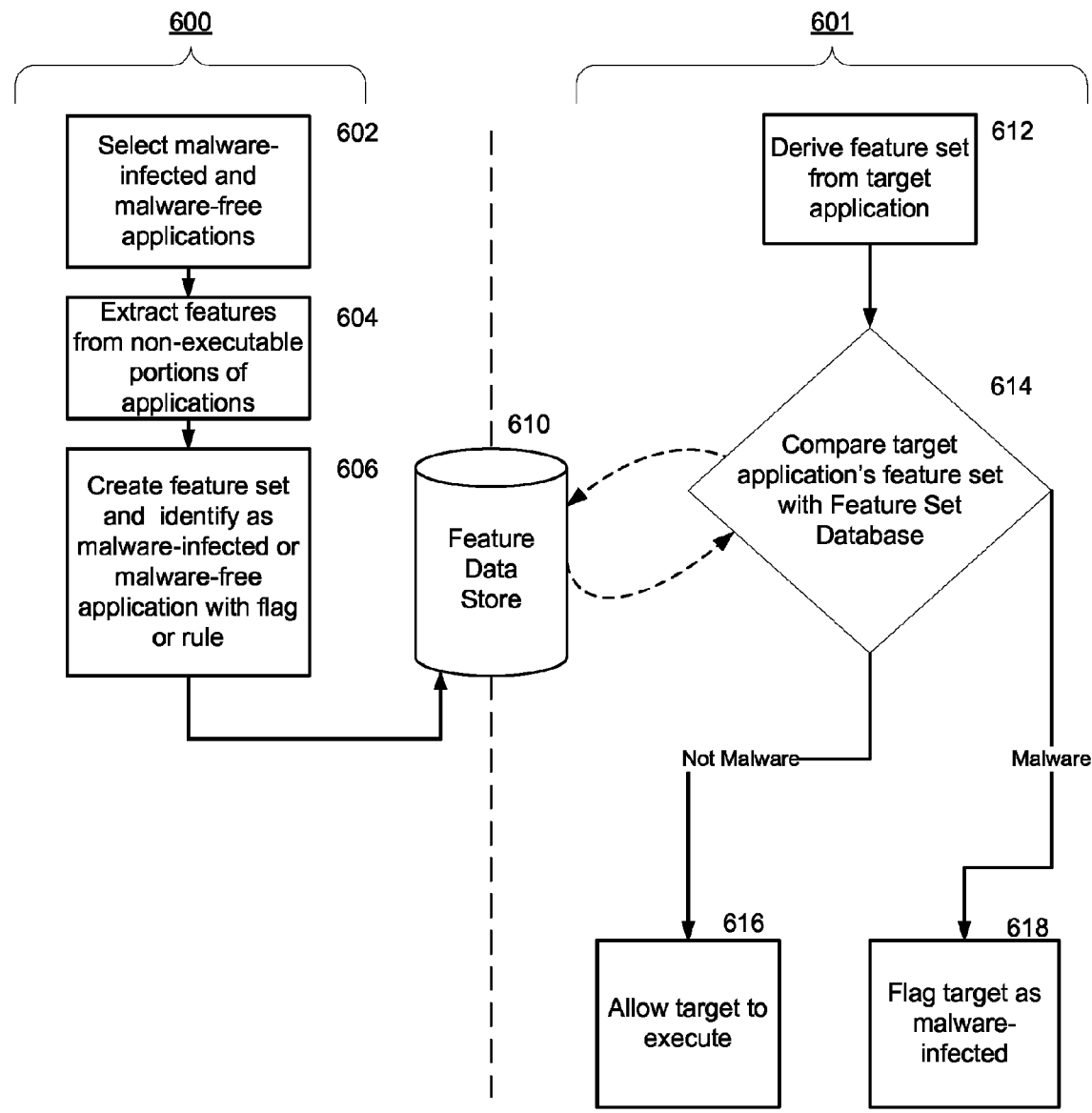
FIG. 6 is a flow chart diagram of a malware detection method for mobile platforms that checks a feature set associated with a target application against a feature data store of feature sets derived from malware-infected and malware-free applications.

Referring now to the flowchart diagram of a limited access malware detection method depicted in FIG. 6, a high level feature set extraction method 600 has the operations of selecting 602 malware and non-malware infected mobile applications, extracting 604 features from the non-executable portions of the applications, and creating 606 features sets and rules from each application and flagging each on as either malware-infected or malware-free. These feature sets and rules are collected in a feature set database or feature data store 610. When a target application needs to be checked, the high level feature based malware detection method 601 derives 612 a feature set from the target application and compares 614 the derived 612 feature set with those in the feature data store 610 according to one or more rules defining when a match of such feature sets occurs. If it is similar to an existing malware feature set, as determined by an associated rule, the high level feature based malware detection method 601 flags 618 the executable as possibly containing malware. If it is more similar to a non-malware feature set, as also determined by one of the associated rules, the high level feature based malware detection method 601 allows 618 the executable to execute on the mobile device.

In one exemplary embodiment of high level feature based malware extraction and detection methods 600, 601, the information used to detect malware comprises a feature set selected from the list comprising such program information or features as file name, file size, vendor of the program and version of the program. The program information used in the high level feature based malware extraction and detection methods 600, 601 is referred to generically as features. Any individual feature by itself usually is neither necessary nor sufficient to tell whether or not a program is malicious. The high level feature based malware extraction and detection methods 600, 601 rather detects malware by using via one or more rules a combination of these features, i.e., to create 606 a feature set or program feature set definition, which is a combination of multiple features to provide the high level feature based malware detection method 601 with sufficient information to distinguish malware-infected from malware-free programs.

Creating Feature Sets

To build a feature data store 610 using the high level feature set extraction method 600, a large number of applications is selected 602 and their feature sets extracted 604. The feature sets vary depending on the operating system. For example, an exemplary feature set for one embodiment of high level feature set extraction method 600 for a limited access mobile platform, e.g., a BlackBerry® type device, consists of the following feature elements:

Application Name
Size
Vendor
Version
Description
URL (uniform resource locator)
SHA-1 Hash of Binary (Secure Hash Algorithm-1)
CRC of Binary (Cyclic Redundancy Check)

These features are part of an executable program header, or similar set of encapsulated data, that is readily extracted. The extracted features are also robust i.e., that it is difficult for a malware to change its features dynamically. In the case of the limited access or BlackBerry® type device, the application name, version, description and URL need to be set before program compile time. In order to change any of the features, one needs to recompile the application itself with new parameters. The CRC, SHA-1 and file size are directly related to the program code. Specifically, SHA-1 is a one way hashing algorithm i.e., it generates a unique hash value for the program data. If a small portion of data changes in the application, the SHA-1 value is very different. The CRC is another hash computed from the program data and changes once the data is corrupted or modified. Hence, changing these parameters dynamically is difficult since it would require changing the code section as well, for which there is limited access due to the device's restrictive operating system.

As an example, a first exemplary embodiment of the high level feature set extraction method 600 extracts 602 a feature set with all of the features elements typically available from a BlackBerry® type system program executable to create 606 the feature set definition or rule for matching. Example 1, extract 604 all feature elements from a program to create a program feature set rule (definition):

(a) Extract features from the program
Feature Element—Application Name="Game"
Feature Element—Size="53678"
Feature Element—Vendor="Fun Games"
Feature Element—Version="1.2"
Feature Element—Description="This is a game"
Feature Element—URL="http://www.linktothegame.com"

(b) Combine all the features separating each feature with a "|"
Feature set=Game|53678|Fun Games|1.2|This is a game|http://www.linktothegame.com (c) Convert the string into hex to create the feature set rule/definition
Feature set rule/definition=47616d657c35333637387c46756e2047616d65737c312e327c5468697320697 320612067616d657c687474703a2f2f7777772e6c696e6b746f74686567616d6 52e636f6d Another example, the second exemplary embodiment details how the high level feature set extraction method 600 processes a blank feature element field in the feature set used to create 606 a program rule or definition. Example 2, extract 604 features and handle missing or empty data:

(a) Extract all available features from the binary
Feature Element—Application Name="Game"
Feature Element—Size="53678"
Feature Element—Vendor="Fun Games"
Feature Element—Version="1.2"
Feature Element—Description="This is a game"
Feature Element—URL=NULL—The system and method in this embodiment handles an empty URL feature by replacing it with a string "null." Any feature definition missing from an application is replaced by a string, in this case the string is "null." Other replacement strings can be selected by those of ordinary skill in the art to accomplish the same result as the use of the "null" string demonstrated in this exemplary embodiment.

(b) Combine all the features separating each feature with a "|"
Feature Set=Game|53678|Fun Games|1.2|This is a game|null (c) Convert the string into hex to create the feature set rule/definition
Feature set rule/definition=47616d657c35333637387c46756e2047616d65737c312e327c5468697320697320612067616d657c6e756c6c The final exemplary embodiment details how the high level feature set extraction method 600 uses a wildcard in a feature element of a rule to capture changes due to polymorphic malware. This embodiment of the system and method enables the detection of malware that modifies or adapts itself during spreading, i.e., malware that exhibits polymorphism. Adaptive malware cloaks itself to make it harder to detect by subtly changing specific features. In this embodiment, the system and method uses partial-matching techniques in order to detect the morphed versions of these malware features. In yet another embodiment, specific features or portions of these program features that are known to remain constant in known malware are emphasized and used to provide a stronger basis for concluding that a specific program is malware. Example 3, extract 604 information and create wildcard(s):

(a) Extract all available features from the binary
Feature Element—Application Name=*
Feature Element—Size="53678"
Feature Element—Vendor="Fun Games"
Feature Element—Version="1.2"
Feature Element—Description=*
Feature Element—URL=*; the * indicates that the data contained in this feature can be effectively anything—such that its data is effectively ignored, creating a wildcard that will enable the system and method to match any entry in that specific feature location in this embodiment.

(b) Combine all the features separating each feature with a "|"
Feature set=*|53678|Fun Games|1.21*|*

(c) Convert the string into hex to create the feature set rule/definition
Feature set rule/definition=2a7c35333637387c46756e2047616d65737c312e327c2a7c2a Other features sets are created 606 from the visible features available on other operating systems, or other implementations of limited access or BlackBerry® type operating systems, as well as subsets of the available features. The feature set is selected by those of ordinary skill in the art using the criteria presented herein in order to obtain sufficient detection rates, (i.e. limited or effectively no false positives, and limited or no false negatives).

Scanning Target Applications

In the preferred embodiment, the high level feature based malware detection method 601 is implemented with two modes of operation. The first mode is an on-demand scanning system whereby malware is detected by scanning all of the device files for malware. The second mode of operation is to detect malware whenever a new application or program is installed by scanning the application/program whenever it is initially installed. Exemplary embodiments as implemented on a BlackBerry® type device, are described below.

On-Demand Scan: A user activated scan that scans all the device files for malware. The high level feature based malware detection method 601 retrieves a list of all the applications installed. Feature sets are derived 612 from all of the applications installed. The feature set of each application is compared 614 against the feature data store 610 comprising feature sets defining known malware. If a match is detected, the application is identified or flagged 618 and then possibly deleted or cleaned. Other appropriate action to contain the malware can also be initiated. If the feature sets do not match, the high level feature based malware detection method 601 allows 616 the executable to run on the mobile platform.

On-Access Scan: This is a background scan that is performed whenever a new application is installed on a mobile platform. Any new installation triggers an event that is caught by the high level feature based malware detection method 601. The newly installed application is then scanned by the system and method to detect malware using the same method as described for On-Demand scan. The advantage with the On-Access scan is that it is non-obtrusive to a user and immediately detects threats before the malware causes further damage or spreads to other mobile platforms or devices in a network.

Heuristic Malware Detection

Figure 7:
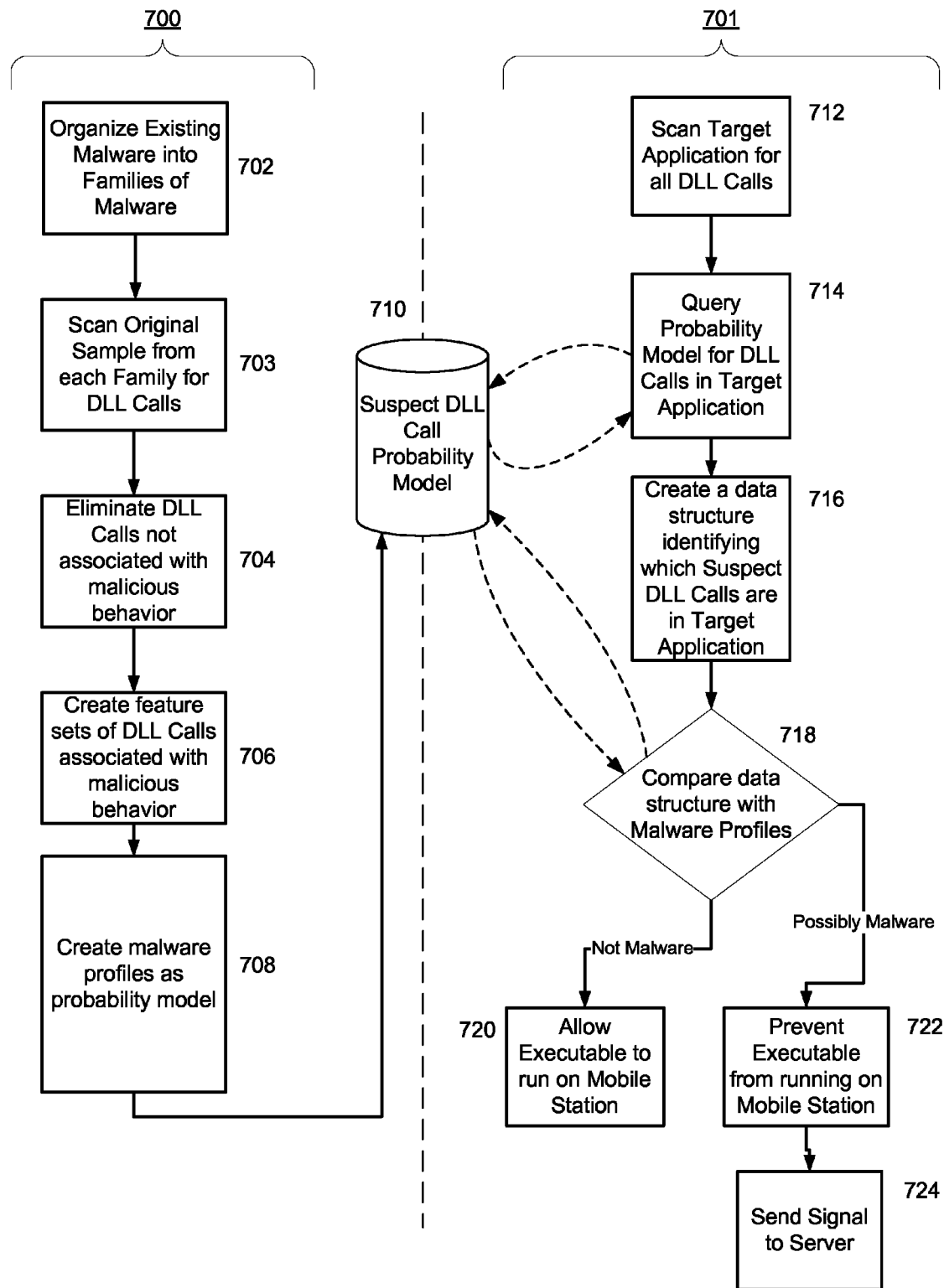
FIG. 7 is a flow chart diagram of a heuristic malware detection method for mobile platforms that compares a target application's DLL calls against a probability model of DLL calls profiles associated with malware-infected applications.

Referring now to the flowchart diagram of a heuristic detection method depicted in FIG. 7, a heuristic malware profile creation method 700 first organizes 702 existing malware based on their functionality into families of malware. In one embodiment, the heuristic malware profile creation method 700 scans 703 the original sample from each malware family to obtain a list of DLL calls used in the malware, then eliminates 704 those DLL calls that are known not to be associated with the core malicious behaviors of the family. Using the DLL calls that remain, the heuristic malware profile creation method 700 creates 706 a feature set of feature elements that is associated with the malicious behaviors of the family. The heuristic malware profile creation method 700 uses training data to create 708 rules and malware profiles as a probability model, populating the suspect DLL call probability model database 710 with rules and profiles of DLL calls used in the different families of malware. When a target application needs to be checked, the heuristic malware profile detection method 701 scans 712 the target applications for DLL calls and then queries 714 the suspect DLL call probability model database 710 for malware profiles that contain those DLL calls and for rules for applying those profiles. A data structure is created 716 that identifies which suspect DLL calls are in the target application, and that data structure is compared 718 with the malware profiles from the suspect DLL call probability model database 710.

A large percentage of malware in the mobile domain demonstrates common functionality (e.g., deleting system files, sending MMS messages). Malware can be classified into different families or classes based on common functionality. Each family of malware has an original sample and variants derived from code of the original sample. The heuristic malware profile creation and detection methods 700, 701 exploit the fact that variants in the same family of malware share malicious core behaviors and have similar patterns of DLL calls, or imports. The list of DLL imports used by a malware gives a high-level view of the behaviors of the malware in terms of its functionality. For example, AppDisabler disables device applications whereas Commwarrior sends unwanted MMS messages. However, each variant can add its own specific functionality (e.g., a graphical interface), and therefore detection of each family of malware exploits only the core behaviors. These DLL imports also are easy to extract from the executable files making it an efficient method.

Every executable uses a set of DLL imports. After organizing 702 malware into families, the set of DLL imports is scanned 703 from the original malware sample for a given family of malware. The total number of DLL imports obtained from an executable is usually very large. To reduce this and obtain the core functionality, imports known to occur commonly in all executables are eliminated 704. User interface related DLL imports are also eliminated 704 because they generally do not contribute to malicious behavior of viruses. The remaining DLLs 10 are used to create 706 a feature set of DLL calls associated with the malicious behaviors for a family of malware.

The heuristic malware profile creation method 700 creates 706 malware profiles of DLL calls in the suspect DLL call database 710 using a heuristic approach to determine which DLL calls should be used to identify malware. The heuristic malware profile creation method 700 takes the feature set for a family of malware and, using training data and an algorithm to reduce the occurrence of false positives and false negatives, determines how many, or which, of the DLL calls in that feature set are needed to indicate the presence of that core malicious behavior in a target application. The heuristic malware profile creation method 700 uses that information to create 708 a probability model for the malware profile(s) in the suspect DLL call probability model database 710.

The preferred model for building a classifier for each virus family is a naive Bayesian model. For a new executable file, the following hypotheses is constructed: the hypothesis that a file contains malicious code H0 and the hypothesis that the code is not corrupted H1. Let C00 be the cost of a virus detection, Cn that of a correct rejection, C10 that of missing or false rejection, and C01 that of false alarm. To minimize the total cost, the following decision rule is used:

$$\frac{P(H_0|A)}{P(H_1|A)} > \frac{C_{01} - C_{11}}{C_{10} - C_{00}} \quad (1)$$

where A is the DLL feature set described above and $P(H_i|A)$ is the posterior probability for $H_i$.

Further, applying the Bayesian rule, (1) simplifies to:

$$\frac{P(A|H_0)}{P(A|H_1)} > \frac{C_{01} - C_{11}}{C_{10} - C_{00}} \frac{P(H_1)}{P(H_0)} = \alpha \quad (2)$$

where $\alpha$ is a parameter which depends on the prior probabilities as well as the cost functions and $P(A|H_i)$ are the corresponding conditional probabilities.

The cost and prior probabilities of C10 and C01 are much larger than Coo and Cn. From a user perspective, false alarms are really undesirable therefore C01 is must be much larger that C10. Therefore, $\alpha$ is going to be a large number. Based on user feedback, the value $\alpha$ is generally chosen to be the minimum that yields less than 1% false alarm rate.

The value of alpha can vary for different families of viruses. The only constraint in selecting the value of alpha for a given family is to minimize the number of false positives below a user desired range (i.e. a larger range for minimal false positives, but greater likelihood of a false negative or a smaller range with more false positives, but lower likelihood of a false negative). A person of ordinary skill in the art can balance the rates of false positives and false negatives by selecting different values of a. Exemplary alpha values for common viruses to meet the less than 1% false positive rate described above include:

75 for Cabir family
90 for commwarrior family
40 for doomboot family

Next, the conditional probabilities $P(A|H_i)$ are computed using training data. For one embodiment of the present system and method, it is assumed that the individual features (the DLL import functions in the DLL set) are independent. In other embodiments, specific features of the DLL import functions in the DLL set are correlated and this correlation is used to improve the quality of the training data. The probabilities for the individual features correspond to the frequency of occurrence of the specific DLL import function in the training data, and are captured in the rule(s).

In one example, the system first evaluates a given executable DLL import feature set to create a DLL import feature vector. The feature set represents the DLL imports as a set of feature elements comprising a 1 or 0 depending on whether or not a specific DLL and function is imported or not. Each features vector is represented as a data structure such as a binary string that completely specifies for each of the DLL import functions, a feature element, in the feature set whether the import occurs or not. For example, with a feature set of the following three feature elements {DLL1, DLL2, DLL3} and an input executable that contained only DLL1 and DLL3, the feature vector is {101}. Then, the probability of that specific executable being a virus with the feature vector {101} is then computed from the conditional probability data developed from the training data:

Prob_Virus=Prob(DLL1|Virus)*(1−Prob(DLL2|Virus))*Prob(DLL3|Virus)

Prob_NonVirus=Prob(DLL1|NonVirus)*(1−Prob(DLL2|NonVirus))*Prob(DLL3|NonVirus)

The conditional probabilities Prob(DLL1|Virus), Prob(DLL2|Virus), and Prob(DLL3|Virus), as well as the Prob(DLL1|NonVirus), Prob(DLL2|NonVirus), and Prob(DLL3|NonVirus), are computed from the training data. Once the probabilities are calculated, a target executable is classified as a virus according to the following probability model: if Prob_Virus>Prob_NonVirus*alpha.

To determine if malware is present in a target application, the heuristic malware profile detection method 701 scans 712 the target application for all DLL calls, and the suspect DLL call database 710 is queried 714 to determine which of those DLLs should be used to identify the existence of malware. A data structure is created 716 which nominally is one or more feature vectors describing the presence or absence of DLL calls (each being a feature element) associated with each of the malware profiles in the suspect DLL call database 710. The heuristic malware profile detection method 701 plugs those feature vectors into the above probability model, or algorithm, with the heuristically derived conditional probabilities to compare 718 the feature vectors to the malware profiles in the suspect DLL call database 710.

An Example Embodiment of a Malware Profile in the Symbian® OS Environment

An embodiment of heuristic malware profile creation and detection methods 700, 701 on a mobile device with the Symbian® OS follows. Although this particular embodiment is based around Symbian® OS malware and files, the system and method can be generalized by one of ordinary skill in the art to other mobile phone operating systems. In the Symbian® OS framework, all interaction between the user process and the kernel takes place using imported DLL functions. Operations which can be used for malicious purposes, such as the system file deletion operation, use some of these imported functions.

Parsing the SIS File:

Symbian® executable code is of following types: .dll, .app, .exe or .mdl. These files are further compressed and packaged into a SIS file format for installation on the mobile device. The SIS file may also contain other content such as bitmaps, icon files (AIF) and compiled resource files (.rsc). The SIS file format contains the following sections. First, a file header (68 or 100 bytes long) followed by records describing the data and the data itself which is pointed to by the records. The data pointed to by the records consist of executable code. Next, the file data is de-compressed before extracting the DLL imports from it. The list of DLL import functions used by a specific file are set as input to the classifier.

Extracting DLL Imports:

The executable code in Symbian® uses a special format called E32 format. It consists of the E32 header followed by a code section, initialized and uninitialized data sections, the import section and the relocation section. The import section starts with a header as defined in the E32ImportSection data structure followed by an array of import blocks as defined in E32ImportBlock data structure. Each import block contains the name of the DLL followed by all the imported functions. Each imported function appears as a number which gives the position in the DLL.

Reducing the DLL Import Set:

Using knowledge-based feature reduction, DLLs that are used by almost all executables malicious or not are eliminated as are those DLLs which provide user interface functionality. Specifically, the following DLLs are filtered out:
APPARC
AVKON
EIK* (all libraries starting with ElK like EIKCOCTL, EIKCORE, . . . ]
AKN* (all libraries starting with AKN like AknNotify)
CKN*
CONE
EUSER Implementation Issues:

One challenge when assigning conditional, or likelihood, probabilities is posed by a limited number of samples in a particular virus class. Due to this problem, it is difficult to assign reliable likelihood probability. To avoid this problem, a uniform high probability is assigned in such cases. This is also used as a tuning parameter in order to avoid false alarms. A high value of this probability means lower chances of false positives. This also means that the feature set becomes less flexible to detecting new variants. The Bayesian classification can result in underflow due to low values of probability. To avoid this problem, the logarithms of the probabilities is used.

Malware Detection Using Code Histograms

Figure 8:
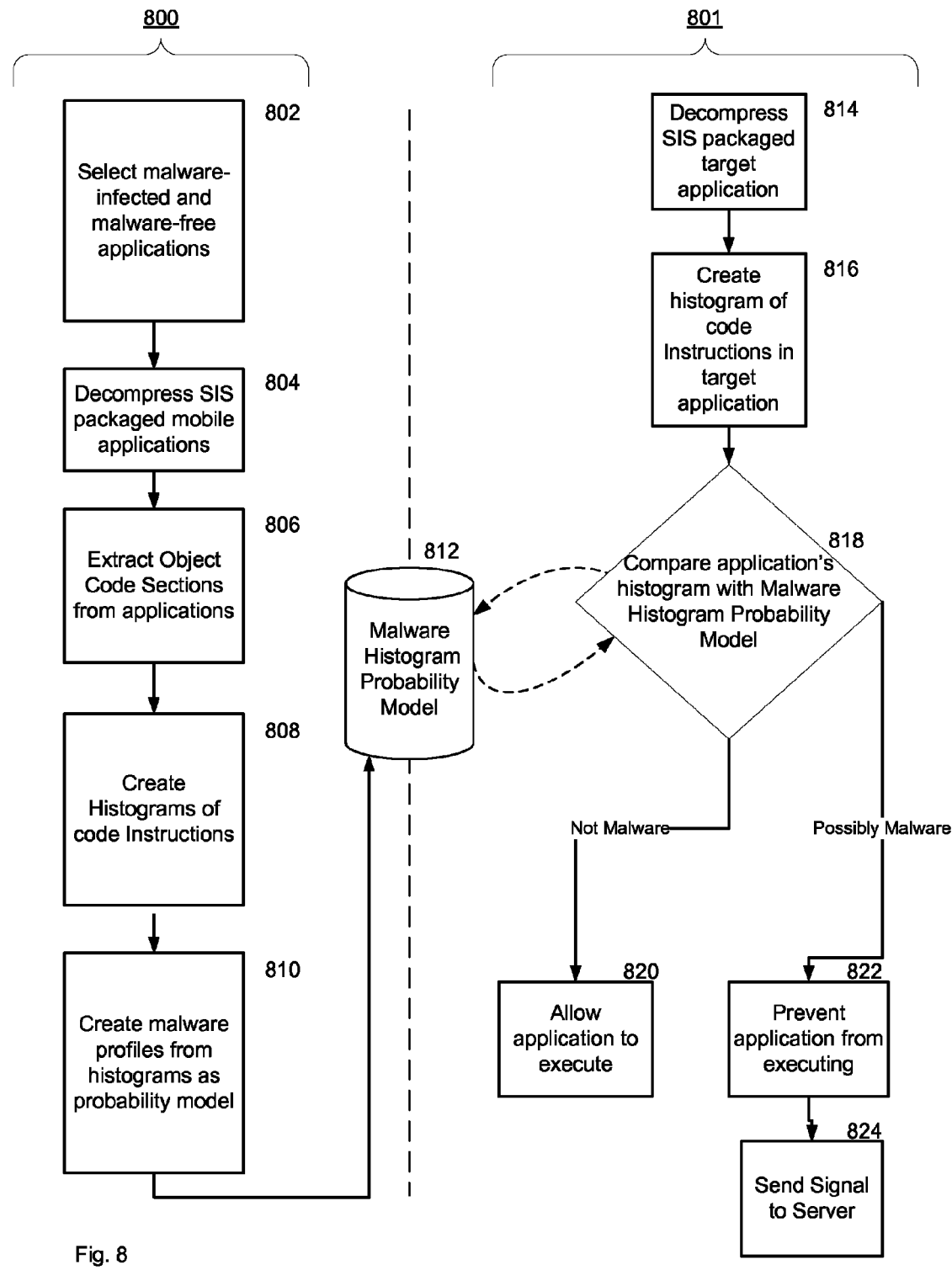
FIG. 8 is a flow chart diagram of a malware code histogram detection method for mobile platforms that compares a target application's object code against a probability model of profiles of malware object code.

Referring now to the flowchart diagram of a histogram detection method depicted in FIG. 8, the malware histogram creation method 800 requires selecting 802 a good sample space of malware-free and malware infected mobile applications. The malware histogram creation method 800 decompresses 804 each mobile application and the object code sections are extracted 806. Next histograms of each application are created 808, and, from those histograms, malware profiles are created 810 and stored in a malware histogram probability model database 812. To scan a target mobile application, the malware histogram detection method 800 decompresses 814 a target application and creates 816 a histogram of the code sections. This histogram is compared 818 with the malware profiles stored in the malware histogram probability model database 812.

The malware histogram creation and detection methods 800, 801 use statistical analysis to extract features from existing virus samples and use them for generic detection of new malware. Because most new malware are variants of existing malware families there is similarity in the object code among existing malware infected files. The malware histogram creation and detection methods 800, 801 exploit this object code similarity.

Code Histograms in the ARM Processor Environment

In one embodiment of the present invention, these generic features are based on ARM opcode. Most mobile phone operating systems (e.g., Symbian®, Windows Mobile®, Palm®) use the ARM processor architecture. The malware histogram creation method 800, shown on 5 FIG. 8, selects 802 a large number of malware-free and malware-infected executables for ARM compatible mobile devices to train the histogram profiles.

Symbian® executable code is of three types: .dll, .app or .exe. These files are further packaged into a SIS file format for installation on a mobile device. The SIS file may also contain other content like bitmaps, icon files (AIF) and compiled resource files (.rsc). The feature 10 extraction is meaningful only if the features are obtained from the executable content (since malicious code is meant to be executed). For each application, the malware histogram creation method 800 decompresses 804 the SIS packages and extracts 806 the object code sections.

The SIS file format contains the following sections: First, a file header (68 or 100 bytes long) followed by records describing the data and the data itself which is pointed to by the records. The malware histogram creation method 800 only uses the data pointed to by the records which consist of the executable files (.app, .dll, .exe). The records also contain pointers to the filename which is used to filter out files not used in the feature extraction. The file data is generally stored in compressed format and needs to be decompressed 804 before it can be used for feature extraction. The following algorithm decompresses 804 the SIS package.

```
Input: a SIS file X
Obtain n the number of files packaged in X.
Get Pointer to first File Record from Header.
while(n>O)
    Obtain Name of File from file record
    If (File obtained is executable)
```

-continued

```
    Decompress file data pointed to by the File Record
    Store the Decompressed data
    n--
    Goto next file record stored contiguously after the previous one
end while
Output: A set of decompressed data files containing executable code.
```

The uncompressed and decoded executable code is not always 100% relevant. Malware can, and almost always does, inserts random data into the code to hide execution patterns. Removal of unnecessary or garbage data provides for better and more efficient analysis. The decompressed data files do not only contain executable code. The executable code in Symbian® use a special format called E32 format. It consists of the E32 header followed by a code section, initialized and un-initialized data sections, the import section and the relocation section. The header consists of the offset and the length of the code section which contains the executable instructions. To extract 806 the object code using the E32ImageHeader class provided by Symbian®, the following algorithm is utilized:

```
Input: Set of decompressed Data Files
For each data file in the Input set
    Extract the header using E32ImageHeader class.
    Extract E32ImageHeader::iCodeSize length of data from the data
    file – starting from E32ImageHeader::iCodeOffset position in the file.
    Store the extracted Code Block
end For
Output: Set of Code-Blocks extracted from Input
```

Histogram Creation

To create 808 a histogram, malware histogram detection method 801 creates 808 an index and a set of histogram data values. The ARM processor has the characteristic that each individual code instruction is a predefined number of bits, e.g., 32 bits, in length. A direct utilization however of this encoding results in a feature set of 232 instructions, meaning a histogram index having 232 members-one for each code instruction.

As an alternative, the code instructions are decoded and divided in broad categories. In an exemplary embodiment, the following set of code instruction categories function as the index to the histogram:

1. AND/OR and addition/subtraction.
2. Multiplication.
3. Store a single value to a virtual address in memory (datatype: unsigned halfword).
4. Load/store a single value from/to a virtual address in memory.
5. Move to ARM register from status register.
6. Move to status register from an ARM register.
7. Branch with exchange (Java enabled).
8. Signed multiply accumulate instructions.
9. Test bits and comparison.
10. Logical bit clear (AND NOT) and logical bitwise OR.
11. Move a 32-bit value or the logical not of it into a register.
12. Branch with exchange/Branch with link and exchange.
13. Count leading zeros.
14. Saturated signed and unsigned arithmetic.
15. Breakpoint.
16. Swap a word in memory with a register, without interruption.
17. The S TREX instruction.
18. The LDREX instruction.
19. Load/Store a single value from/to a virtual address in memory.
20. SIQ
21. Pack 16-bit halfwords into a 32-bit word.
22. SIU
23. Select between two source operands based on the GE flags.
24. Reverse bytes within a word or halfword.
25. Unsigned sum of absolute differences.
26. Undefined instruction.
27. Store/Load multiple registers to/from memory.
28. Branch relative.
29. Relative branch with link.
30. Move between coprocessor and the ARM register (MCRR/MRRC).
31. Store/Load to/from coprocessor single or multiple 32-bit values.
32. Coprocessor data processing.
33. Move between coprocessor and the ARM register (MCR/MRC).
34. Software interrupt instruction.
35. Change processor state.
36. Set the endianness for data access.
37. Preload hint instruction.
38. Return from exception.
39. Save return state.
40. Branch with link and exchange.

The following preferred instruction decoding algorithm is used in conjunction with the ARM instruction set encoding table:

Input: A 32-bit length instruction.
(1) Check the leading hex digit of the instruction, bits 28 to 31. If this has a value OxF, then jump to the end of the table.
(2) Index through the table using the second hex digit, bits 24 to 27.
(3) Depending on context, index through the table using a set of decoding bits including the following: bit 4, bit 7, bit 23.

Output: An instruction index in the set of instruction categories.

The features or data in the histogram are the frequency of occurrence of each of the distinct code instruction categories described above. These features are obtained from each file using the following compute feature histogram algorithm:

Input: The set of extracted instructions.
(1) Map each extracted instruction to one of the 40 labels defined. Sometimes these 4 bytes are strings that do not correspond to any command. In these situations, we simply set the corresponding label to be 0.
(2) Count the total number of each label in all the executable portions of the file.
(3) Let the total number of label i to be Nii, 0:::; i:::; 40.

Output: Histogram A of the labeled features (1-40):

$$A=(a_0,a_1,\ldots,a_{40}), a_i=N_i/\Sigma_{i=0}^{40}N_i$$

Malware Profile Creation

To create 810 a malware profile used to check against an unknown target application, a Bayesian classifier and training data are employed as rule. Let H0 be the hypothesis that a file contains malicious code and H1 be the hypothesis that the code is not corrupted. A particular file with feature A is considered malicious if:

$$P(H_0|A)>P(H_i|A)$$

Applying Bayesian rule, we have:

$$p(A|H_0)P(H_0) > p(A|H_1)P(H_1)$$

Modeling the probability density of feature A given each hypothesis as a Gaussian function, that is:

$$p(A | H_k) = N(A - m_k, \Sigma_k) = \frac{1}{|2\pi\Sigma_k|^{1/2}} \exp\left(\frac{1}{2}(A - m_k)\sum_k^{-1}(A - m_k)^T\right),$$

$$k = 0, 1$$

The prior probabilities, $P(H_0)$ and $P(H_1)$, and the parameters, $m_k$ and $\Sigma_k$, are estimated from the training data. The training data file is comprised of a large set of non-virus files and about 50% of all known viruses.

Rather than attempting to estimate the above parameters accurately with all the features, a subset A* from the whole feature set is used for classification. A* is obtained using cross-validation with the following algorithm:
(1) Let A*=0, i.e., an empty set.
(2) Iteratively add features into A*, until all the features were added to A*:
(3) In each step, among all the features that do not belong to A* find Ai so that the feature set {Ai}∪A* yields the minimum error rate of classification. Then add $A_i$ to A*.

This process builds the parameters for the trained malware profile. The error rate of a particular feature set is tested by equally dividing all the training files into three groups. Among the three groups, pick two of them for training and the remaining one for testing. Let Pn and PR be the percentage of detection, i.e., the percentage of malicious files that are detected, the percentage of correct reject, i.e., the percentage of normal files that are classified as not malicious. The error rate is the average of Pn and PR on the testing set.

The malware histogram probability model database 812 stores the feature set and associated histogram, also known as the rule, after the probabilities have been computed using the training data. When a target application is to be scanned, the malware histogram detection method 801 decompresses 814 the target application and a histogram of the code instructions is created 816 using the same functions above. The selected feature sets of the histogram of the target application are compared 818 using the associated rule with the trained probabilities of the malware profiles stored in the malware histogram probability model database 812 to determine if malware is present in the target application.

Feature Based Malware Detection

Figure 9:
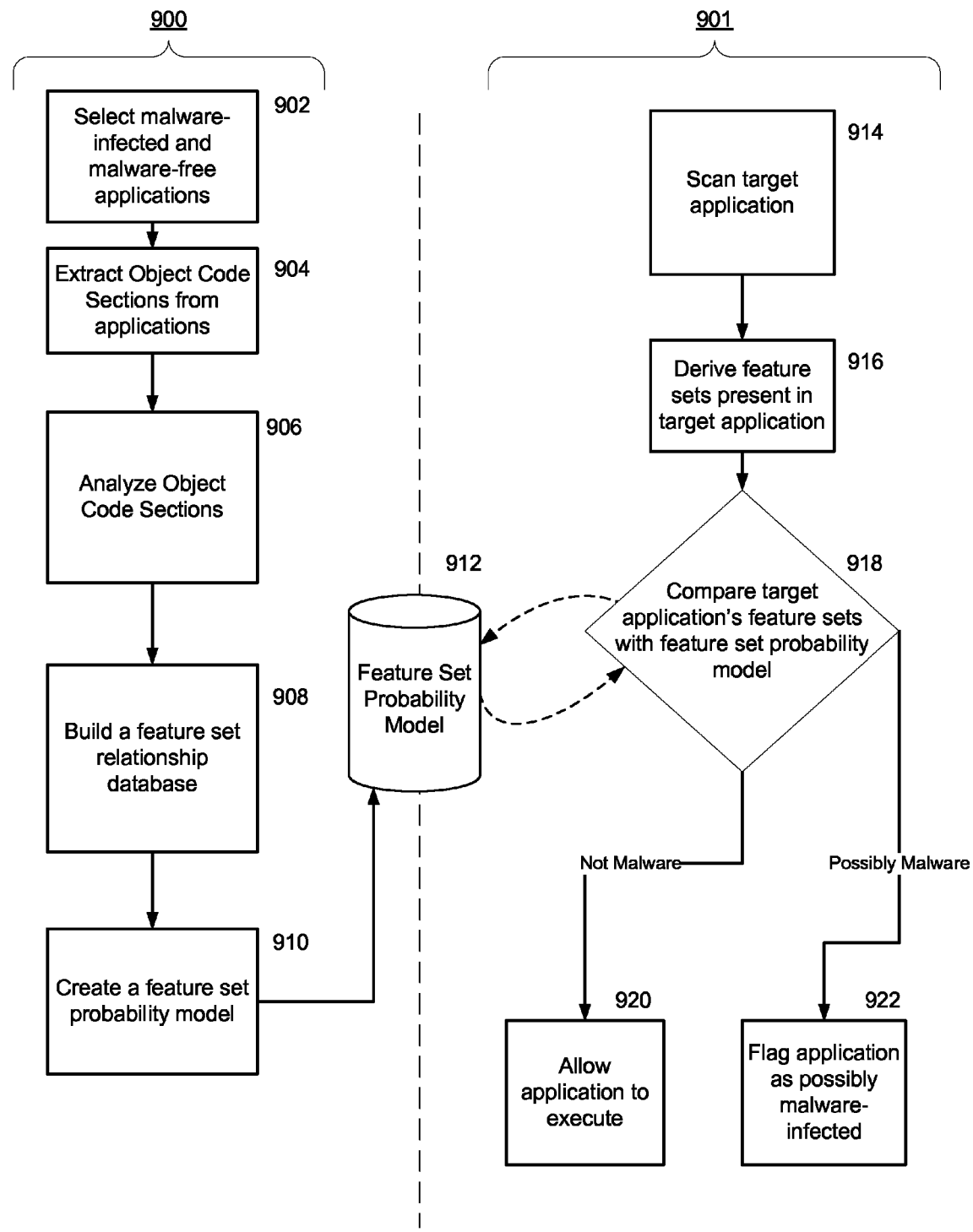
FIG. 9 is a flow chart diagram of a feature based malware detection method for mobile platforms that compares a target application's code and resource utilization against a probability model of profiles derived from known malware applications.

Referring now to the flowchart diagram of a feature based detection method depicted in FIG. 9, a feature based relationship determining method 900 builds a feature set probability model database 912 of malware probability profiles and associated rules for matching by first selecting 902 malware-free and malware-infected mobile applications, extracting 904 object code from the selected applications, analyzing 906 the code by monitoring ARM branch-link commands, identifying common code procedures, and monitoring activated functions in the mobile device, building 908 feature set relationships and creating 910 malware probability models. To check for the presence of malware, the feature based malware detection method 901 scans 914 a target application's code, derives 916 which feature sets are present in the target application, and compares 918 the derived feature sets to the malware probability models stored in the feature set probability model database 912 via the appropriate rules. If the feature sets match a malware profile according to the rule(s), the system and method identifies and flags 922 the target application as possibly containing malware. Otherwise, the target application is allowed 920 to run on the mobile platform.

The feature based malware extraction and detection methods 900, 901 use probability models to examine the relationship between a set of basic procedures used by normal non-malicious, or malware-free, programs and a set of procedures typically used by malicious malware. To build 908 a feature set of basic procedures used by malware applications, the feature based relationship determining method 900 selects 902 a number of malicious applications and breaks them down into their respective sequences of basic procedures which are then analyzed 906 for both code and behavior.

Common Malicious Procedures

The detection method identifies procedures that resemble malware behavior in an executable, including but not limited to Self-Replication, Spreading, and System Corruption. These procedures have a high probability of being found in malware.

Self-Replication:

A malware program attempts to make a copy of itself. Once this is done it creates an installation package file so that it can be installed on other devices. This functionality is implemented in a number of ways, but generally the malware follows the following strategy:
The program issues a call to open its executable file and copy its data to memory
The program loads a template to memory that includes a pre-defined header format for the installation package
The program fills the template header with data specific to the executable, e.g., a pointer to executable code
The program compresses the executable contents and packages it along with the header as an installation file.

Spreading:

A malware program attempts to spread from one device to another. On mobile platforms, the most effective spreading mechanisms for malware include Bluetooth® and MMS. Malware programs that spread over Bluetooth® usually adopt the following strategy:
Search for nearby Bluetooth devices
Lock on to a particular device and send its duplicated copy (generated as explained above) to the device
Repeat the above steps whenever it finds new devices or at random intervals of time Malware that spreads over MMS can use the phone book addresses on the mobile platform to transmit themselves. In such a case, for a receiving mobile device it appears as though the message has been sent by a trustworthy source resulting in them installing the malware. Another advantage of MMS is that, unlike Bluetooth®, spreading it is not constrained by physical distance. That is, Bluetooth® spreading can only occur when mobile devices are close in proximity to each other whereas this is not necessary for MMS spreading. Malware that spreads over MMS generally adopts the following strategy:
Open the phone book and read its contents
Send its duplicated copy to phone numbers read from the phone book
Repeat the above steps at random intervals in time or at a specific time. For e,g, some malware send the message only at late night.

System Corruption:

A malware program destroys or corrupts application files or system files on the mobile device. Such malware can target specific applications such as anti-virus applications or in general destroy all installed applications. The following general strategy is used to corrupt applications on a device:

Kill application processes running on the device
    Replace pre-installed applications with dummy files of the same name Corrupting application files often results in loss of data and the need to reinstall applications. The general approach used to corrupt system files on a device is as follows:

Replace system files with dummy files, e.g., files used in booting a device, files used for standard device fonts, etc.
    Reboot the device forcibly causing it to crash on reboot due to the absence of certain required files for start-up.

However, malware that corrupts system files can result in the device failing to recover from such an attack by the malware. A hard reset which erases all stored data on the device may be the only way to recover in some cases.

Code Analysis

To analyze 906 the code, the feature based relationship determining method 900 extracts 904 object code for individual procedures, disassembles it into assembly code, and categorizes it. Most malicious procedures such as replication, spreading, and system corruption use system functions, e.g., functions like File Open, File Read, etc. Identifying 906 these functionalities in binary executables allows them to be used as feature elements in a feature set. System functions are provided by the mobile platform for which the malware has been written. Most existing mobile executables are written to run on ARM processors. Whenever a system function call is used, it translates into a Branch-Link command in terms of ARM assembly code. Hence, the use of standard functions is identified by analyzing the parameter of the Branch-Link ARM command in an executable. In particular, the following procedures are identified using this method:

File System related functions, e.g., read, copy, replace, etc.
    File compression or encryption
    Bluetooth protocol related functionality
    Messaging Related functionality
    Socket connections and use of the network stack on the device
    Phone/Address book access related functionality
    Process related functionality, e.g., Process kill
    Device related functionality, e.g., Device restart Behavior Analysis To analyze 906 the behavior, the feature based relationship determining method executes individual procedures in a mobile handset environment and monitors 906 the events, or activated functions, that occur from executing the procedures. It is possible that the above mentioned code analysis does not provide all the features of malware. Consider the following example: A malware when installed tries to access an instant messaging application and asks the application to broadcast instant messages to all of its contacts. Since the malware is using the application as intended, code analysis does not reveal its malicious intent such that the malware is achieving its goal indirectly. Hence, apart from analyzing 906 the executables and installation packages of mobile malware, additional procedures (or features) are obtained by observing or monitoring 906 the run-time behavior of malware on a real device by allowing it to execute on the device. For this, a monitoring system is developed on a mobile device to monitor usage of key resources on the device that are capable of being misused by malware. These include accessing communication protocols and system applications. Some of the preferred monitored system resources include:

Bluetooth® protocol data transfer
    Wi-fi Interface data transfer
    Network interface data transfer
    Access to privacy information like address book
    Messaging services
    System file modification
    Email-client applications and browser applications
    File system access
    Memory consumption due to multiple processes Feature Set Creation The feature based relationship determining method 900 uses the information from the code analysis and behavior analysis to build 908 a feature set. Each event and corresponding assembly code make up a feature element and together the feature elements from all known malicious functions or behaviors form a feature set. The feature set is obtained 908 after code/behavior analysis of multiple malware-infected applications. The feature set listed below represents an example feature set. These feature elements of the feature set are listed for convenience only. It would be readily apparent to one of ordinary skill in the art to develop a comparable set of feature elements. Sample feature elements are:

1. File Open: This feature is related to opening replication, i.e., a malware program opens its file and tries to copy itself.
2. File Replace: This feature is related to System corruption where a system file is replaced by a malware file programmatically
3. Make Directory: This feature is related to creating an installation package which can be used for replication/spreading
4. Bluetooth® Initialize: This feature identifies an initialization of Bluetooth® functions for spreading
5. Compression: An installation package contains executables that need to be in compressed format. Hence, this feature identifies if a malware is trying to compress its executables
6. SDP Agent: This feature is related to the Bluetooth® spreading functionality
7. Messaging Initialize: We identify the initialization of multimedia messaging for spreading using this feature
8. Socket connection: We identify the socket connections related to spreading using this feature.
9. Phone Reboot: This feature is related to system corruption where a malware corrupts system files and tries to reboot the device
10. Protected Process: This feature is also related to system corruption where the malware makes itself protected and hence is difficult to be deleted/cleaned
11. Kill a Process: This feature is related to system corruption where a malware tries to kill a device process (for example, an anti virus process)
12. Contact Database: This feature is related to Spreading using MMS. Using this feature we identify if a malware tries to access a User's contact database
13. SMS Number Access: This is again related to the spreading using MMS or sending a SMS message to Phone number thereby causing the user financial loss.
14. Suspicious String: This is related to replication. We identify if a malware is trying to copy its own file
15. Template Loading: This feature is related to replication in that it identifies whether a malware is loading a template of a required header format 16. Illegal Format Files: This is related to system corruption.
17. Dummy Files: This is also related to system corruption. Here the malware installation file replaces system files
18. Suspicious Boot Loading: This can occur for any type of malware. Here a malware attempts to start itself on reboot
19. Rom File Replacement: A malware corrupts the device by replacing required system files
20. Font File Replacement: We identify if a malware corrupts the device by adding ill-formatted font files
21. Lock Drive: A malware locks the device memory card by inserting a password
22. Suspicious String (bootloading): A malware tries to load a dummy executable during boot up. Such activity can be detected using a string pattern in the executable.
23. Font File Replacement (no executables present along with this): A malware tries to corrupt system fonts. Hence it contains no executables other than a dummy system font file
24. Get Machine Specific Id: A malware gets the machine id of a device and uses it for malicious purposes
25. More Boot Files Than Executable Files: More boot files than executables suggest that the malware is trying to load executables other than the executables in its own set
26. Premium SMS Numbers Being Used: Premium SMS numbers hard coded in a program may suggest that the malware is trying to automatically send SMS messages to this number
27. Internet Socket: A socket connection indicates network activity
28. Monitor Network Connections: A malware may monitor network connections for malicious reasons, e.g., identifying the data being passed through a connection Probability Model Creation Once a malware feature set is sufficiently complete, two probability models are created 910 based on the feature sets: one for malware and the other for benign or malware-free programs. With these probability models, it is possible to compare 918 a target application with the probability models and distinguish malware-infected from malware-free programs using a Bayesian decision rule. An exemplary Bayesian classifier follows:

Let H0 be the hypothesis that a file contains malicious code and H1 otherwise. Let A={an} be the feature set characterizing the procedures of a file, where an=1, meaning that the corresponding procedure exists, or 0, meaning the corresponding procedure does not exist. Therefore, this file is malicious if:

$$\frac{P(H_0 \mid A)}{P(H_1 \mid A)} > \frac{C_{01} - C_{11}}{C_{10} - C_{00}} \quad (1)$$

where P(Hi|A) is the posterior probability of the hypothesis Hi given the input, for i=0 or 1. In a general situation, C00 and C11 are 0, i.e., there is no cost associated with correct detection and rejection. Hence (1) reduces to, $$\frac{P(H_0 \mid A)}{P(H_1 \mid A)} > \frac{C_{01}}{C_{10}} \quad (2)$$

It is easy to see that the decision rule is closely related to the costs of false alarm and missing the detection of malware. If the cost of raising a false alarm is much higher than that of missing malware, a quite stringent decision rule is used; that is, only a program that is very likely to be malicious is detected as a virus. Consequently, there are fewer false alarms, but there is also a tendency to miss more viruses.

The task here is to compute the likelihood P(Hi|A). Applying the Bayesian rule [3, 6] to (2), provides:

$$\frac{P(A \mid H_0)}{P(A \mid H_1)} > \frac{C_{01}}{C_{10}} \frac{P(H_1)}{P(H_0)} = \alpha \quad (3)$$

where $P(A|H_i)$ is the corresponding likelihood and $\alpha$ is a parameter that depends on the prior probabilities $P(H_i)$ as well as the cost functions $C_{01}$ and $C_{10}$.

Since there is not any explicit formula to compute P(A|Hi) directly, P(A|Hi) is estimated from existing malware samples and benign programs. Let A0={0, 1, 1, 0, ..., 0} be a configuration of A, the most direct way of estimating the value of P(A=A0|Hi) is to count the total number of programs that has the same feature configuration as A0 and then divide the number by the total number of programs. By doing so, with N features, there is a need to evaluate total 2N individual configurations, which is computationally infeasible for large N.

To simplify the computation of P(Hi|A), additional variables {bm} are introduced. Each variable {bm} characterizes a core function of malware-infected and/or malware-free program, and the entire set {bm} includes all the core functions. Assume that once these variables are given, the posterior probability of whether a file is malicious or not does not depend on the procedure any more, that is, $$P(H_i|b_1, b_2, \ldots b_M, A) = P(H_i|b_1, b_2, \ldots b_M) \quad (4)$$

In addition, variables {bm} are assumed to be independent. Therefore, $$P(H_i|b_1, b_2, \ldots b_M) = \Pi_m P(b_m|A) = \Pi_m P(b_m|A_m) \quad (5)$$

The last step utilizes the fact that a core function is only related to a subset of procedure functions Am. $A_m \subset A$. Therefore, there is:

$$P(H_i \mid A) = \Sigma_{b_1} \Sigma_{b_2} \ldots \Sigma_{b_M} P(H_i, b_1, b_2, \ldots b_M \mid A) = \quad (6)$$
$$\Sigma_{b_1} \Sigma_{b_2} \ldots \Sigma_{b_M} P(H_i \mid b_1, b_2, \ldots b_M, A) P(b_1, b_2, \ldots b_M \mid A) =$$
$$\Sigma_{b_1} \Sigma_{b_2} \ldots \Sigma_{b_M} P(H_i \mid b_1, b_2, \ldots b_M, A) \Pi_{b_m} P(b_m \mid A_m)$$

Again with the assumption that variable {bm} are independent, there is:

$$P(H_i \mid b_1, b_2, \ldots b_M) = \frac{P(b_1, b_2, \ldots b_M \mid H_i) P(H_i)}{P(b_1, b_2, \ldots b_M)} \quad (7)$$
$$= P(H_i) \Pi_m \frac{P(b_m \mid H_i)}{P(b_m)}$$
$$= P(H_i)^{1-M} \Pi_m P(H_i \mid b_m)$$

Therefore, $$P(H_i|A) = P(H_i)^{1-M} \Sigma_{b_1} \Sigma_{b_2} \ldots \Sigma_{b_M} \Pi_{b_m} P(H_i|b_m) P(b_m|A_m) \quad (8)$$

Again, use the assumption that once a core function is given, the posterior probability does not depend on the related procedure function any more, that is $$P(H_i|b_m,A)=P(H_i|b_m) \quad (9)$$

Finally, there is:

$$P(H_i|A) = P(H_i)^{1-M} \Sigma_{b_1} \Sigma_{b_2} \ldots \Sigma_{b_M} \prod_{m=1}^{M} P(H_i|b_m, A_m) \quad (10)$$

$$= P(H_i)^{1-M} \Sigma_{b_1} \Sigma_{b_2} \ldots \Sigma_{b_{M-1}}$$

$$\left[ \prod_{m=1}^{M-1} P(H_i|b_m, A_m) \right] \Sigma_{b_M} P(H_i|b_M, A_M)$$

$$= P(H_i)^{1-M} \Sigma_{b_1} \Sigma_{b_2} \ldots \Sigma_{b_{M-1}}$$

$$\left[ \prod_{m=1}^{M-1} P(H_i|b_m, A_m) \right] P(H_i|A_M)$$

$$= P(H_i)^{1-M} \Sigma_{b_1} \Sigma_{b_2} \ldots \Sigma_{b_{M-2}}$$

$$\left[ \prod_{m=1}^{M-2} P(H_i|b_m, A_m) \right] P(H_i|A_{M-1}) P(H_i|A_M)$$

$$= \ldots$$

$$= P(H_i)^{1-M} \prod_{m=1}^{M} P(H_i|A_M)$$

$$= P(H_i) \prod_{m=1}^{M} \frac{P(A_m|H_i)}{P(A_m)}$$

By applying (10) to (2), there is:

$$\prod_m \frac{P(A_m|H_0)}{P(A_m|H_1)} > \alpha \quad (11)$$

The difference between equations (3) and (11) is that in (11), A is divided into several groups, each of which corresponds to a specific core function. Since a group {Am} usually contains a few features, the corresponding probability $P(A_m|H_i)$ can be easily estimated.

Writers of malware code often try to obfuscate their malware by reordering sections of code to escape detection by malware scanners that look for matching signatures or code templates. The probability model described above does not have an order specific limitation, and can therefore detect malware once certain features are recognized as being present, regardless of how they are coded by malware writers.

Feature Set Relationship Database Creation

The malware procedure identification, code/behavior analysis, and development of the Bayesian Classification algorithm are tailored to each manufacturer/model of mobile phone for each service provider data network. However, because many mobile phones have significant overlap in their use of common processors and operating systems, and many data networks use similar protocols, many feature sets and Bayesian formulas are reused to some degree. Once the feature sets and Bayesian formulas (rules) are complete, the feature sets and rules, e.g., formulas, are stored in a feature set probability model database 912 and downloaded into a mobile device.

Malware Detection

To check a target application suspected of containing malicious code, the feature based malware detection method 901 scans 914 the target application's code in the mobile device. Each of the feature elements in a pre-defined feature set are derived 916 from the target application. The result is represented in a binary feature set vector, or feature vector, with a "1" indicating that the procedure is present in the searched executable, and a "0" otherwise. An example is provided below using the above sample feature set:

VeriChat is an always-on, unified Instant Messaging (IM) application for Symbian® devices. It is a benign program with the following feature set A={1 0 1 0 0 0 0 1 0 0 0 0 0 0 0 0 0 0 0 0 0 1 0 0 0 0}.

Commwarrior is a Symbian® Series 60 worm that spreads through Bluetooth or MMS. It has the following feature set A={1 1 1 1 0 1 1 1 0 1 1 0 0 1 1 0 0 0 0 0 0 0 1 0 0 0 0}.

Upon comparison of these feature sets, both programs have some common functionality, but it is clear that Commwarrior uses more functions related to malicious behavior. The target application's feature set vector is compared against the malware probability models and if there is a match, according to the associated rule, with one of the malware probability models, the application is flagged 922 as being malicious in nature and possibly containing malware. Otherwise, the application is allowed 920 to run on the mobile device.

Reporting System/CoreStats

Figure 10A:
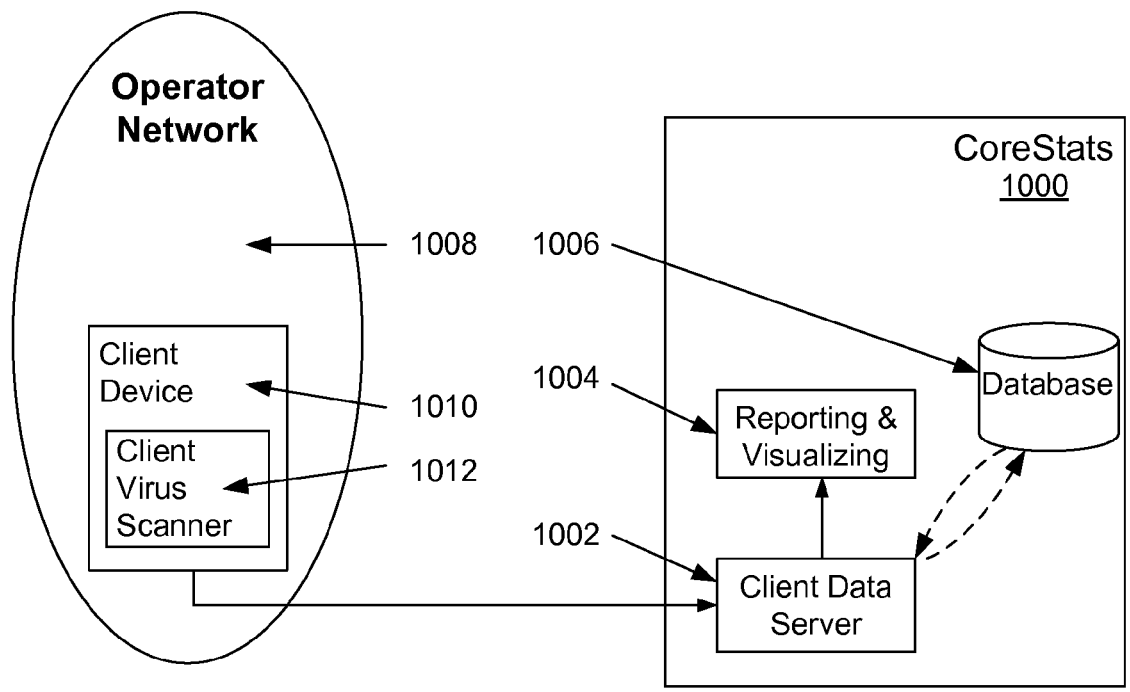
FIG. 10*a* is a schematic diagram of one embodiment of the reporting system's (CoreStats') architecture.

Referring now to the schematic diagram of CoreStats depicted in FIG. 10a, one embodiment of the system and method for reporting and visualizing viruses on mobile networks, CoreStats 1000, comprises the following components:

Reporting/Visualization Engine 1004
Client Data Server 1002

CoreStats 1000 monitors the Operator's Network 1008 by receiving communications from mobile client devices, or mobile platforms, 1010. The mobile client devices 1010 in the operator network 1008 contain a client virus scanner 1012 capable of detecting viruses on mobile client devices 1010. Referring to the schematic diagram of a transaction depicted in FIG. 10b, a full circle transaction comprises an infection report 1014 sent from a client device 1010 to CoreStats 1000, and an acknowledgement 1016 sent from CoreStats 1000 back to the client device 1010.

Figure 11:
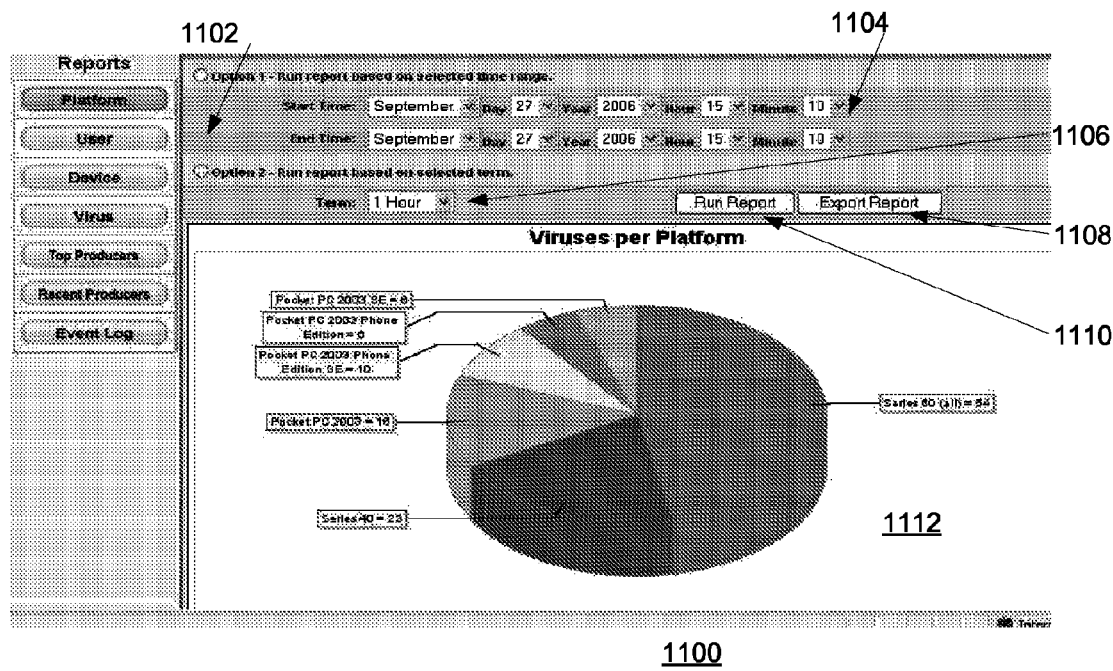
FIG. 11 is a screen snapshot of sample malware per platform report on CoreStats.

Referring now to an exemplary screen shot of CoreStats in FIG. 11, a sample malware per platform report 1100 in CoreStats 1000 illustrates which mobile platforms are infected with the most malware. Referring now to an exemplary screen shot of CoreStats in FIG. 12, a sample malware spreading report 1200 in CoreStats 1000 illustrates which malware are spreading the fastest. Referring now to an exemplary screen shot of CoreStats in FIG. 13, a sample user infection report 1300 in CoreStats 1000 shows recently infected mobile platforms. Referring now to an exemplary screen shot of CoreStats in FIG. 14, a sample virus producer report 1400 in CoreStats 1000 shows which users, or clients, are responsible for spreading the most malware.

FIG. 10a illustrates a deployment of CoreStats 1000 outside of the operator network 1008 but alternatively, it also is deployed effectively at various other points in the mobile network. In one embodiment of CoreStats 1000, the reporting/visualization engine 1004 uses data from the client data server 1002 to graphically report malware statistics in the network. The client devices 1010 contain virus scanning 1012 algorithms which report back information about any malware to the Client Data Server 1002.

Detection of Handset Infection

The reporting/visualization component 1004 takes input from the client data server 1002 to generate statistics and dynamic graphs depicting malware activity. Client devices 1010, usually mobile platforms such as mobile phones, contain virus scanning software, or client virus scanners 1012, that scan the mobile devices 1010 for malware. In one embodiment of the present invention, a handset upon detecting malware generates an internal log file in plain text containing the name of the infected file and the name of the malware that infected the file as a semi-colon delimited text file. The entries in the log file are as follows: "C:\CinBell_Viruses.zip-Cabir.D(sis); C:\CinBell_Viruses\3d oidi500.sis-Cabir.D(sis); C:\CinBell_Viruses\autoexecdaemon.SIS-Cabir.gen(app);".

The client virus scanners 1012 report back information about any malware to the client data server 1002. Report generation can be automatically triggered upon finding a virus, upon a periodic fixed time interval, or in response to polling by the client data server 1002. The reports are sent, for example, using http, ftp, or any packet data transmission method as would be generally known in the art. Such reports typically comprise information such as, but not limited to detailed virus/threat vector information, device identification including type of mobile device, operating system, software and versions, and user information. In an exemplary embodiment of the invention, a sample report contains the following information:

Product Identification to identify the Client Virus Scanner software. This consists of "productid+majorversion+minorversion+patchversion";
Infected filename;
Firmware of the device i.e. the operating system information;
Software version of the device;
Unique Identifier of the infected application;
Name of the malware infection; and,
Date and time of infection.

Storing of Handset Infection Reports

CoreStats 1000 performs information gathering functions. Embedding within CoreStats 1000 is a database 1006 to store raw information gathered by CoreStats 1000 from the client virus scanners 1012. User specific information is stored in a secure portion of the database 1006 to maintain customer privacy. In an exemplary embodiment of the present invention, the database 1006 has a log file comprising the following information:

Detection Time;
Virus Name;
Infected File Name;
Infected File Size;
Infected Packet Size;
Infected Packet Number;
Source IP;
Source Port;
Source Phone Number;
Destination IP;
Destination Port;
Destination Phone Number; and,
Protocol name.

Full-Circle Transactions Between CoreStats 1000 and Client Devices 1010

Figure 10B:
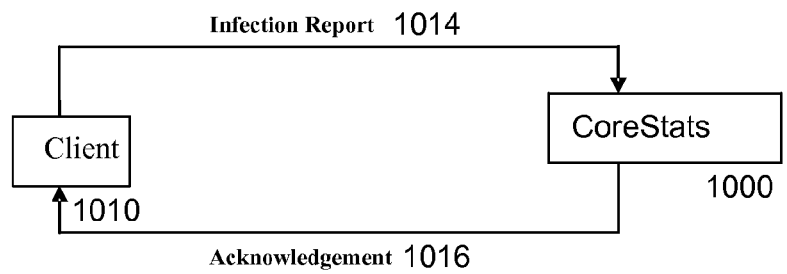
FIG. 10*b* is a representative diagram of the communications between a client device and CoreStats.

Referring now to the flowchart diagram of a transaction process depicted in FIG. 10b, which illustrates an efficient full-circle transaction between the client device 1010 and CoreStats 1000. Once the client device 1010 sends an infection report 1014 to CoreStats 1000 (on the network), there is an acknowledgement 1016 sent back to the client device 1010 which causes it to delete its existing infection report 1014 and start creating a new infection report 1014. This particular implementation has two advantages. First, client devices 1010 do not send duplicated information to the CoreStats 1000 about old virus infections, only current ones. Second, client devices 1010 are less burdened memory-wise since they need to retain infection reports 1014 locally for a small duration of time. This is especially important in the case of mobile devices 1010 since they have limited memory resources.

Infection reports 1014 can be configured to be pushed from the client device 1010 to CoreStats 1000 either ad hoc or periodically at regular intervals; the infection reports 1014 can remain in the client device 1010 until queried (pulled) by CoreStats 1000; or the infection reports 1014 can be delivered to CoreStats 1000 using some combination of pulling and pushing.

Analysis of Handset Infections

CoreStats 1000 also performs report generating functions. The reporting/visualization engine 1004 uses both stored and real-time information, including individual user information, to generate statistics and dynamic graphs depicting malware activity and relative levels of malware activity. For example, the reporting/visualization engine 1004 generates straightforward visual reports to alert managers and operators as to which platforms are infected with the most viruses, which viruses are spreading the fastest, the most recently infected users, and which infected users are spreading the most viruses.

Reports

Referring to an exemplary screen shot of CoreStats in FIG. 11, a sample malware per platform report 1100 in CoreStats 1000 illustrates which platforms are infected with the most malware. The sample malware per platform report 1100 comprises option selections 1102 for generating a report regarding a selectable interval of time in the past 1104 or the most current period of time 1106. The report is run to the screen 1110 or it is exported 1108 in a data structure, for example, a semi-colon delimited text file. When run to the screen 1110, the data can be presented any number of ways including, for example, a graphical representation 1112 of the number of viruses per platform.

Figure 12:
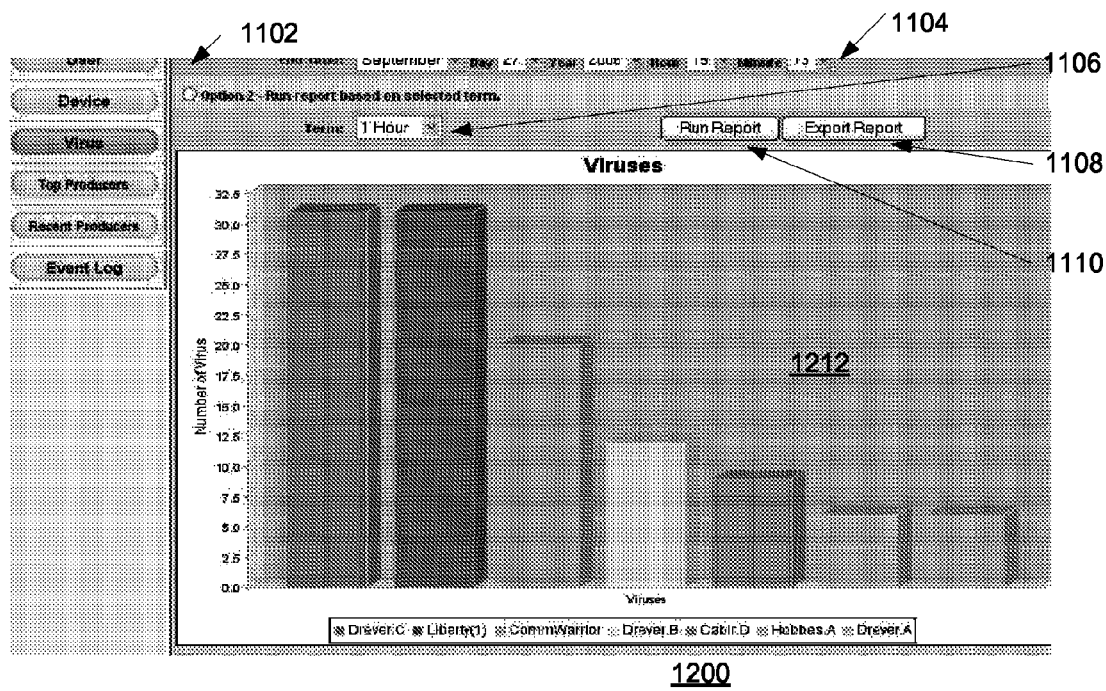
FIG. 12 is a screen snapshot of sample malware spreading report on CoreStats.

Referring now to an exemplary screen shot of CoreStats in FIG. 12, a sample malware spreading report 1200 in CoreStats 1000 illustrates which malware are spreading the fastest. The sample malware spreading report 1200 comprises options selections 1102 for generating a report regarding a selectable interval of time in the past 1104 or the most current period of time 1106. The report can be run to the screen 1110 or it can be exported 1108 in a data structure, for example a semi-colon delimited text file. When run to the screen 1110, the data can be presented any number of ways including, for example, a graphical representation 1212 of the number of instances of each virus detected in the network.

Figures 13, 14:
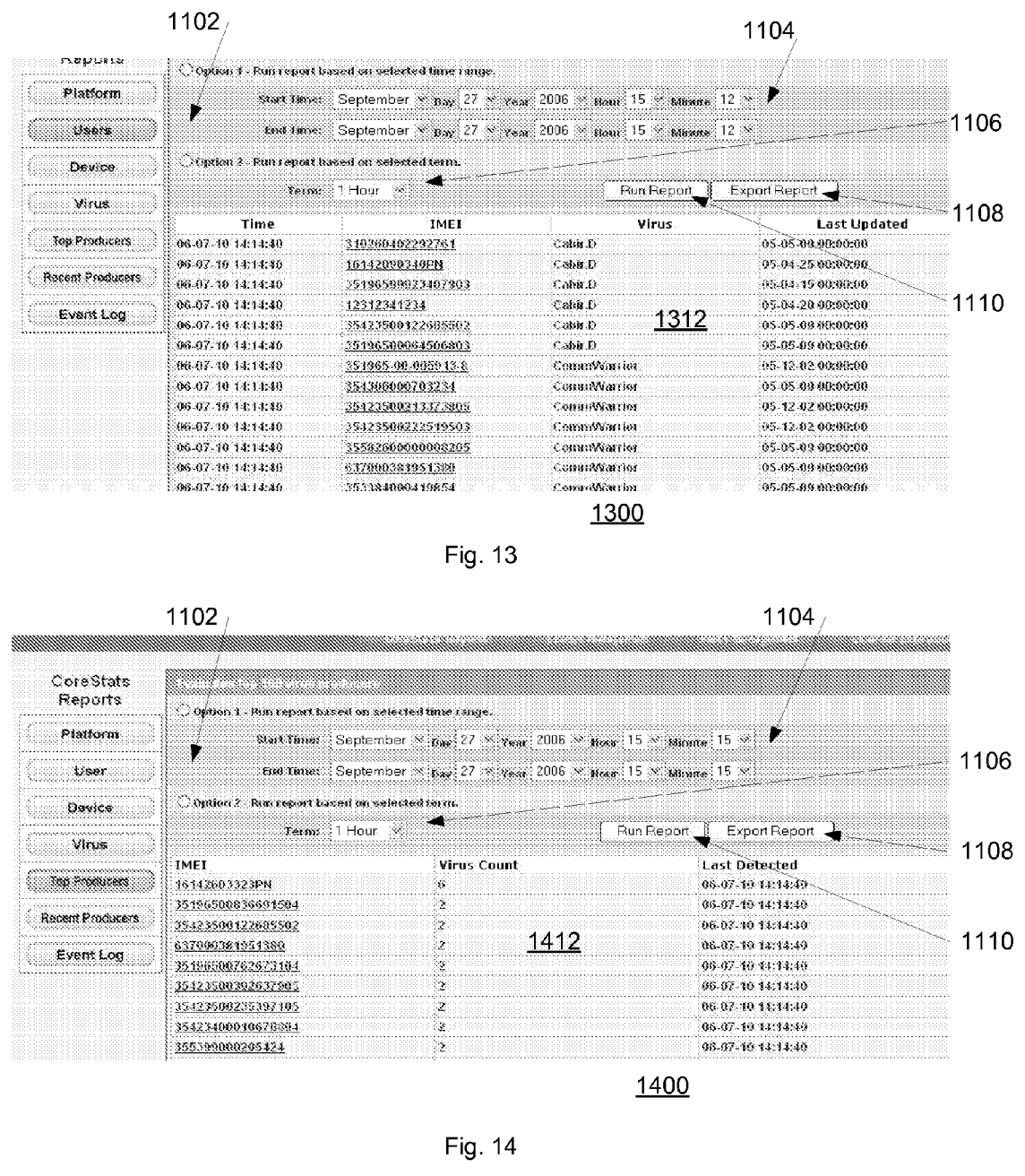

Referring now to an exemplary screen shot of CoreStats in FIG. 13, a sample user infection report 1300 in CoreStats 1000 shows recently infected users. The sample user infection report 1300 comprises option selections 1102 for generating a report regarding a selectable interval of time in the past 1104 or the most current period of time 1106. The report can be run to the screen 1110 or it can be exported 1108 in a data structure, for example a semi-colon delimited text file. When run to the screen 1110, the data can be presented any number of ways including, for example, a text list 1312 of which platforms are infected by which viruses.

Referring now to an exemplary screen shot of CoreStats in FIG. 14, a sample virus producer report 1400 in CoreStats 1000 shows which users are responsible for spreading the most malware. The sample user infecting report 1400 comprises option selections 1102 for generating a report regarding a selectable interval of time in the past 1104 or the most current period of time 1106. The report can be run to the screen 1110 or it can be exported 1108 in a data structure, for example a semi-colon delimited text file. When run to the screen 1110, the data can be presented any number of ways including, for example, a text list 1412 of which platforms are infected by, and therefore likely to be spreading, the most viruses.

Some additional reports generated by the reporting/visualization engine 1004 include the growth of individual viruses over time, and infected subscriber information. User specific information is stored in a secure portion of the database 1006 to maintain customer privacy. Other functions and metrics can be formed by one of ordinary skill in the art.

Interaction with Other Systems

Another way CoreStats 1000 helps mobile network administrators and operators is by reporting alarms upstream to other operational support systems or OAM&P (Operations, Administration, Maintenance, and Provisioning) systems used by network service providers to manage their networks 1008. The term "operational support system" is generally understood to include a broad range of computer systems and servers created by many different vendors and used by network operators to manage and control their networks and individual network elements. An operational support system may have centralized or distributed servers. Network elements are those individual systems that are assembled by the network operators to build out a functioning network. Many network elements are managed by one or more operational support system, and are capable of reporting alarms to operational support system, as well as receiving and sending configuration information.

The CoreStats System

In one embodiment, CoreStats 1000 operates as a stand-alone system with some associated virus scanning modules running independently in user mobile devices 1010 to aid in reporting and visualizing viruses on mobile networks 1008, and monitoring the current status of virus infections on a mobile network 1008. CoreStats 1000 can also integrate with other operational support systems, reporting alarms upstream to typical OAM&P (Operations, Administration, Maintenance, and Provisioning) systems used by network service providers to manage their networks 1008. In other embodiments, CoreStats 1000 is an application that operates inside the operator network 1008, at the edge of the operator network 1008, inside a network element of the operator network 1008, or in a combination of locations. As one familiar in the art would appreciate, these are merely exemplary embodiments of the invention for illustration purposes only, and are not intended to limit the invention to any particular configuration or topology.

Figure 15:
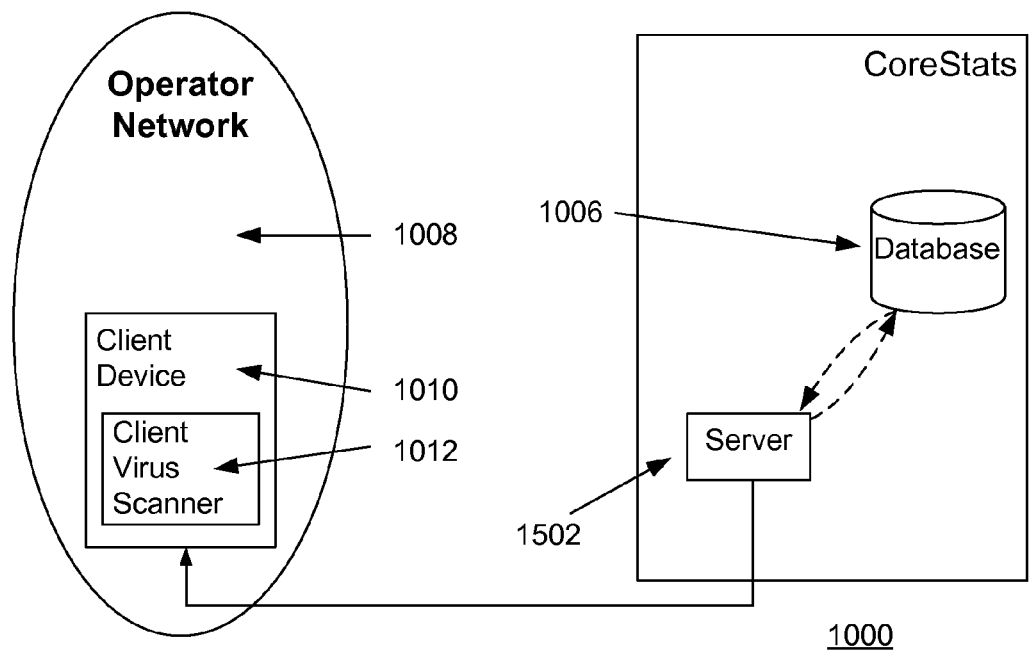
FIG. 15 is a schematic diagram of one embodiment of the CoreStats' architecture for updating a mobile client device's malware signatures using a device independent secure management protocol.

Updating Malware Protection Using a Device Independent Secure Management Protocol Referring now to the schematic diagram of CoreStats depicted in FIG. 15, a central management server 1502 in CoreStats 1000 uses a device independent secure management protocol, such as a DM protocol, to update malware definitions in client malware scanners 1012 from a database 1006 of the most recent malware definitions. The client malware scanners 1012 reside in mobile client devices 1010 in an operator's network 1008.

In the preferred embodiment, the SyncML DM standard, as promulgated by the Open Mobile Alliance (OMA), provides a Device Management (DM) protocol for transfer management actions between a client device 1010 or mobile phone client and a central management server 1502. SyncML DM enables an operator in the enterprise or carrier network 1008 to remotely manage the settings of the mobile client devices 1010 using the DM management objects. Those settings can, in principle, be of any kind, including but not limited to, anti-virus definitions, security parameters and other information to mobile client devices 1010 or phones connected to the enterprise or carrier network 1008. The description of the present invention in terms of the OMA/DM framework is for convenience only and describes the preferred embodiment of the present invention. The system and method of the present invention applies equally to any network communication scheme employing a device independent secure management protocol.

The OMA DM framework builds upon the principles of data synchronization. Data synchronization is typical two-way synchronization, where one central database is synchronized with one or several remote databases. Changes can happen in both places. OMA DM is characteristic in the way that the original data is always in a database 1006 accessible from a central management server 1502, for example in CoreStats 1000, and may be placed in the operator's network 1008 and owned by a service provider or an operator (shown in FIG. 15 as outside the operator's network 1008.) Settings data are applied from the central place to the remote place. This must be done in a controlled and secure way. The exchange of OMA DM commands and status uses binary encoded XML (WBXML). The central management server 1502 is a device management server that sends DM commands to the client device 1010 and the client device 1010 answers back with a status message. The DM commands can be Add, Get, Replace, Delete, and so on, and the status is the result in form of a status code and eventual returned data (for example, with a Get command).

The OMA DM implementation in the client device 1010 consists of two main parts:

OMA DM Protocol

OMA DM User Agent

The OMA DM Protocol holds the state machine controlling establishment, management, and termination of the DM session. OMA DM User Agent takes care of executing the actual OMA DM commands and generates the relevant status messages.

All data to be managed is organized in a management tree. The management tree is an abstraction of the mobile device. The management tree contains various types of nodes including a root node, interior node, and a leaf node.

The leaf node holds the data. The data can be one single value or a structure or even a file including any kind of data. The interior nodes are used to structure the data and to address where in the tree the data is stored. The root is the placeholder for the complete management tree. The management tree is grouped into Management Objects. Each management object holds a well-defined group of leaf nodes each holding a certain parameter.

The malware protection system as disclosed herein uses a leaf node as defined by the OMA DM standard to hold the database 1006 of malware signatures or definitions for the malware protection system on a given mobile device. In addition to malware signatures, a leaf node can also be used to hold specific malware protection system settings, such as desired update and full-system scan parameters, and a variety of security settings and other relevant information. The update of the malware signatures or definitions is performed using the OMA DM protocol.

Under the OMA DM protocol, the OMA definition User Agent executes the OMA DM commands necessary to update the malware system files and other settings such as security parameters and information on a mobile client device 1010. The User Agent also provides status information back to the central management server 1502 to indicate successful update, etc. Further, the User Agent can also be used to execute specific anti-virus commands, such as initiate a full system scan, etc.

The database 1006 connected to the OMA DM enabled central management server 1502 serves as a central repository for malware definitions, settings and other information. The OMA DM enabled central management server 1502 also coordinates the operation of specific anti-virus programs and security levels throughout the operator's network 1008. For example, when malware is detected on the network 1008, the OMA DM enabled central management server 1502 issues commands to the mobile devices 1010 to update the relative malware scan levels relative to specific threat vectors, as well as, updated malware definition files to enable the mobile client device 1010 to handle the potential virus outbreak. The OMA DM enabled central management server 1502 is maintained as either an enterprise or carrier network-based system.

The individual enterprise or carrier network 1008 OMA DM enabled central management servers 1502 obtain malware update information and system security parameters and other information through a variety of means. In one embodiment, the malware signatures and updates are provided by a third-party server as part of a subscription service. The updated signatures and information are received by the OMA DM enabled central management server 1502 are then propagated using the OMA DM protocols to the mobile client devices 1010 associated with the OMA DM server. In a second embodiment, the carrier or enterprise central management server 1502 actively manages the security parameters and other settings as necessary based on the subject threat of a given malware on the managed enterprise or carrier network 1008 at a given time. In yet another embodiment, the malware signatures are actively identified by programs running on the enterprise or carrier network server 1008 that then identify specific signatures in the database 1006 for distribution to the mobile client devices 1010.

The present malware protection system embeds the malware protection application at the firmware level of the client device 1010, thereby reducing the need for customization of the client malware scanner 1012 for different platforms. The client malware scanners 1012 on the mobile client devices 1010 are managed by the DM server 1008 at the carrier or enterprise network level. The DM server 1008 in CoreStats 1000 thus manages all updating of the client devices' 1010 malware definitions using the OMA DM protocols.

Although the disclosed embodiment utilizes the OMA DM framework for updating antivirus definitions and other system protocols and settings through a managed device network, other methodologies and frameworks are utilized in a similar manner using the methods disclosed herein by one of ordinary skill in the art.

CONCLUSION

The numerous embodiments described above are applicable to a number of different applications. One particular application where the system and method is particularly applicable is in detecting malware in mobile environments. The malware detection system and method also has many additional applications outside the mobile environment that would be apparent to one of ordinary skill in the art.

The embodiments of the invention shown in the drawings and described above are exemplary of numerous embodiments that may be made within the scope of the appended claims. It is contemplated that numerous other configurations of the disclosed system, process, and devices for detecting malware may be created taking advantage of the disclosed approaches. It is the applicant's intention that the scope of the patent issuing herefrom will be limited only by the scope of the appended claims.

What is claimed is:

1. A computing device for developing search strings for detecting malware in compressed data, the device comprising:
   a non-transitory memory having stored thereon a plurality of malware-infected executables infected with a family of malware, wherein each of the plurality of malware-infected executables comprises a respective compressed code portion; and
   a hardware-based processor configured to:
      extract a plurality of candidate strings from the compressed code portions of the plurality of malware-infected executables;
      identify at least one of the plurality of candidate strings that is present in each of the plurality of malware-infected executables as a search string common to the compressed code portions of the plurality of malware-infected executables; and
      store the search string common to the plurality of malware-infected executables to a mobile device to cause the mobile device to determine whether target applications including compressed code portions are infected with malware based at least in part on the search string.

2. The computing device of claim 1, wherein the hardware-based processor is configured to extract candidate strings from uncompressed header portions of the plurality of malware-infected executables.

3. The computing device of claim 1, wherein the candidate strings are extracted from non-ASCII portions of the compressed code portions of the plurality of malware-infected executables.

4. The computing device of claim 1, wherein the hardware-based processor is configured to identify a plurality of search strings common to the compressed code portions of the plurality of malware-infected executables from the plurality of candidate strings.

5. The computing device of claim 1, wherein to searching is performed using an algorithm selected from the group consisting of: a greedy algorithm, a heuristic algorithm, an evolutionary algorithm, and dynamic programming.

6. The computing device of claim 1, wherein the hardware-based processor is configured to:
   receive a target executable with the search string present in the target executable;
   incorporate the target executable into the plurality of malware-infected executables;
   re-execute the identifying to develop one or more improved search strings; and,
   distribute the improved search strings to the mobile device.

7. The computing device of claim 6, wherein the hardware-based processor distributes the improved search strings using a device independent secure management protocol.

8. A mobile device for detecting malware in compressed data, the mobile device comprising:
- a non-transitory memory configured to store a search string common to compressed code portions of a plurality of malware-infected executables, wherein each of the malware-infected executables is infected with a family of malware; and
- a hardware-based processor configured to:
    - scan a compressed code portion of a target executable for the search string to detect whether the search string is present in the compressed code portion of the target executable, and
    - determine that the target executable is infected with malware from the family of malware when the search string is detected in the compressed code portion of the target executable.

9. The mobile device of claim 8, wherein the hardware-based processor is further configured to:
- obtain a second, different search string extracted from uncompressed header portions of the malware-infected executables; and
- scan an uncompressed header of the target executable for the second search string.

10. The mobile device of claim 8, wherein the hardware-based processor is further configured to report the target executable to an operational support system after determining that the search string is present in the compressed code portion of the target executable.

11. The mobile device of claim 8, wherein the mobile device is selected from a group consisting of: a mobile telephone, a smart phone, a mobile computing device, a smart handheld device, and a network element.

* * * * *